US012713293B2

(12) United States Patent
Choi et al.

(10) Patent No.: US 12,713,293 B2
(45) Date of Patent: Aug. 18, 2026

(54) METHOD AND DEVICE FOR OPERATING WIRELESS-CORE CONVERGED CONTROL PLANE IN WIRELESS COMMUNICATION SYSTEM

(71) Applicant: Samsung Electronics Co., Ltd., Gyeonggi-do (KR)

(72) Inventors: Jinho Choi, Gyeonggi-do (KR); Dongmyung Kim, Gyeonggi-do (KR); Younggyoun Moon, Gyeonggi-do (KR); Jungsoo Jung, Gyeonggi-do (KR); Sunwoo Cho, Gyeonggi-do (KR); Jiyoung Cha, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 267 days.

(21) Appl. No.: 18/565,793

(22) PCT Filed: Jul. 21, 2022

(86) PCT No.: PCT/KR2022/010693

§ 371 (c)(1),
(2) Date: Nov. 30, 2023

(87) PCT Pub. No.: WO2023/013936

PCT Pub. Date: Feb. 9, 2023

(65) Prior Publication Data

US 2024/0267786 A1 Aug. 8, 2024

(30) Foreign Application Priority Data

Aug. 2, 2021 (KR) ........................ 10-2021-0101612
May 4, 2022 (KR) ........................ 10-2022-0055197

(51) Int. Cl.
*H04W 28/06* (2009.01)

(52) U.S. Cl.
CPC .................................. *H04W 28/06* (2013.01)

(58) Field of Classification Search
CPC .. H04L 41/0823; H04W 24/02; H04W 28/06; H04W 40/00; H04W 48/18; H04W 80/02; H04W 88/08; H04W 88/14; H04W 92/24
See application file for complete search history.

(56) References Cited

U.S. PATENT DOCUMENTS 10,512,013 B2 12/2019 Kim et al.
10,531,264 B2 1/2020 Kim et al.
(Continued)

FOREIGN PATENT DOCUMENTS

KR 10-1542414 7/2015
KR 10-2048742 11/2019
WO WO 2020/160176 8/2020

OTHER PUBLICATIONS

PCT/ISA/210 Search Report dated Oct. 20, 2022, issued on PCT/KR2022/010693, pp. 4.
(Continued)

*Primary Examiner* — Kashif Siddiqui
(74) *Attorney, Agent, or Firm* — The Farrell Law Firm, P.C.

(57) ABSTRACT

The present disclosure relates to: a communication technique merging IoT technology with a 5G communication system for supporting a data transmission rate higher than that of a 4G system; and a system therefor. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. The present disclosure provides a method for introducing a service based interface (SBI) even to a base station in a wireless communication system.

20 Claims, 24 Drawing Sheets

(56) References Cited

U.S. PATENT DOCUMENTS

| | | | | |
|---|---|---|---|---|
| 2006/0171403 | A1* | 8/2006 | Kim | H04W 84/22 370/410 |
| 2015/0381429 | A1* | 12/2015 | Wu | H04L 41/12 709/223 |
| 2016/0212653 | A1 | 7/2016 | Wang et al. | |
| 2019/0116631 | A1* | 4/2019 | Talebi Fard | H04W 80/10 |
| 2020/0374946 | A1* | 11/2020 | Bedekar | H04W 76/12 |
| 2021/0037587 | A1 | 2/2021 | Teyeb et al. | |
| 2021/0112616 | A1 | 4/2021 | Karandikar et al. | |
| 2021/0127319 | A1 | 4/2021 | Huang et al. | |
| 2021/0185603 | A1 | 6/2021 | Bogineni et al. | |
| 2021/0227423 | A1 | 7/2021 | Bogineni et al. | |
| 2022/0124542 | A1 | 4/2022 | Li et al. | |

OTHER PUBLICATIONS

PCT/ISA/237 Written Opinion dated Oct. 20, 2022, issued on PCT/KR2022/010693, pp. 3.

Cha, Jiyoung et al., "RAN-CN Convergence for 6G Cellular Networks", 2021, pp. 11.

* cited by examiner

FIG. 4

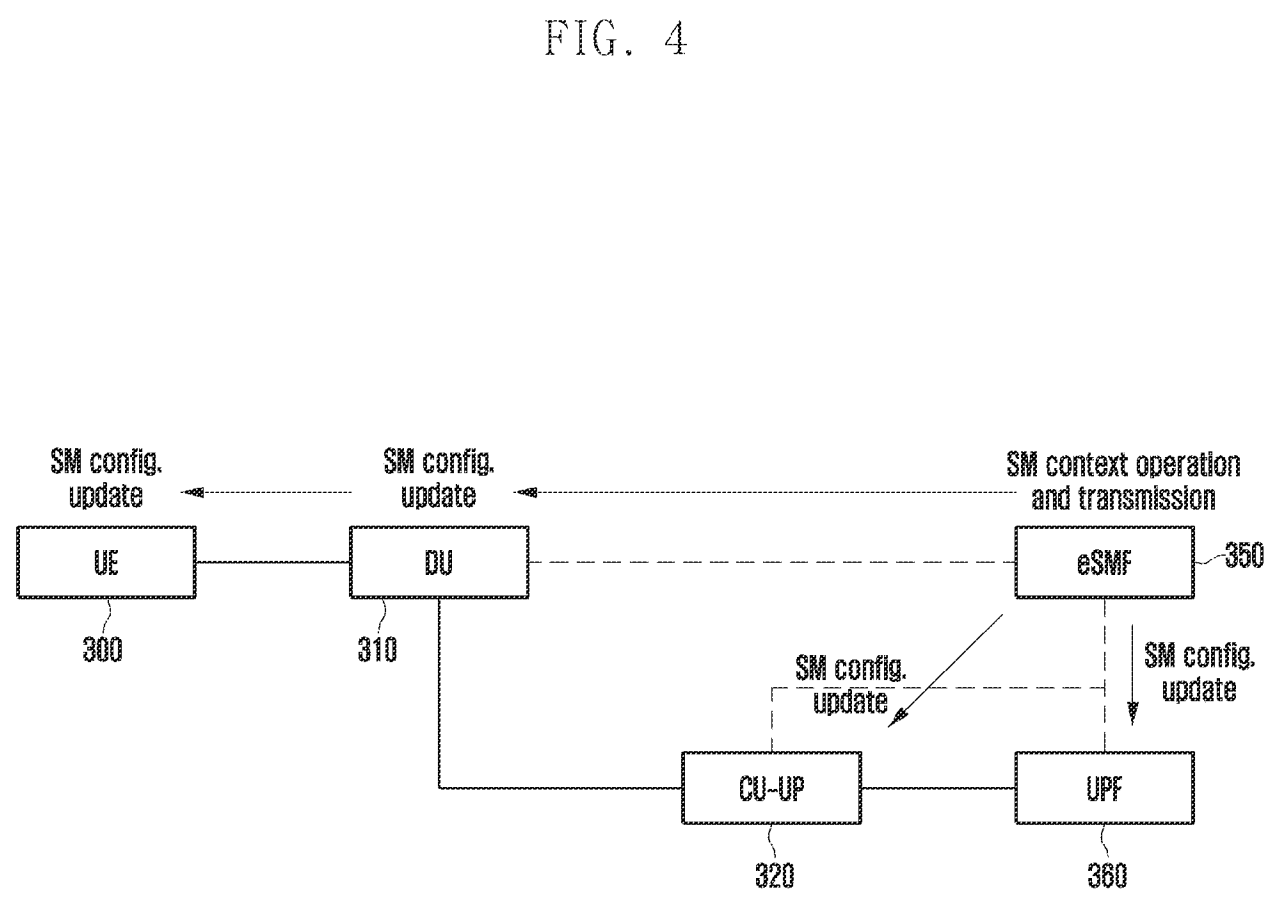

SM context operation and transmission
350
eSMF
SM config. update
UPF
360
SM config. update
CU-UP
320
SM config. update
DU
310
SM config. update
UE
300

FIG. 5

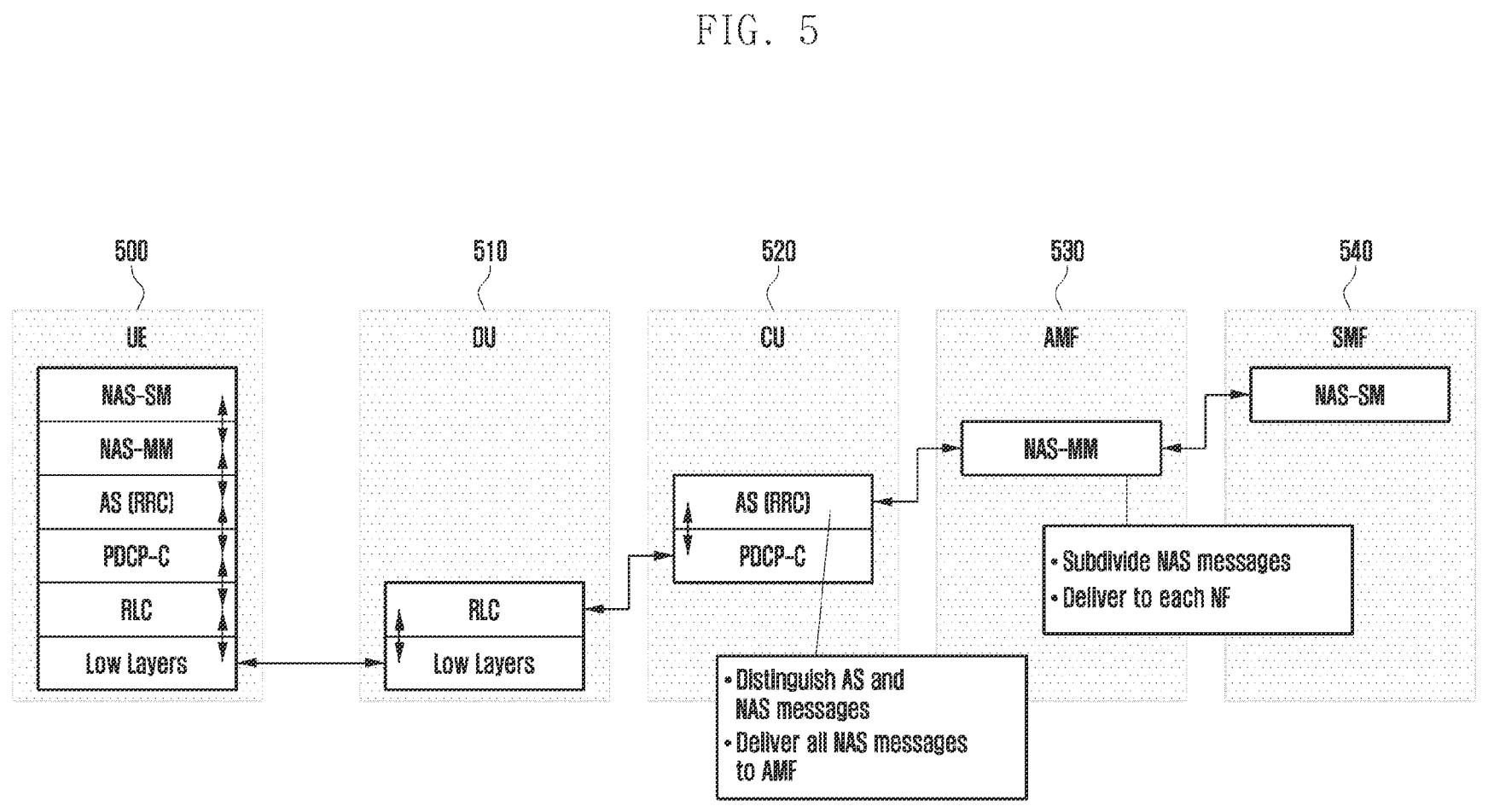

500 UE
NAS-SM
NAS-MM
AS (RRC)
PDCP-C
RLC
Low Layers

510 DU
RLC
Low Layers

520 CU
AS (RRC)
PDCP-C

• Distinguish AS and NAS messages
• Deliver all NAS messages to AMF

530 AMF
NAS-MM

• Subdivide NAS messages
• Deliver to each NF

540 SMF
NAS-SM

FIG. 8

| Service discriminator | NF type | Instance lists | Address | note |
|---|---|---|---|---|
| PDU session establishment request | SMF | SMF 1 | http://10.~ | NSI ID = 1 |
| PDU session modification request | | SMF 2 | http://10.~ | DNN = A |
| ⋮ | | ⋮ | ⋮ | ⋮ |
| Inter-RAN handover request | AMF | AMF 1 | http://10.~ | NSI ID = 1~2<br>DNN = A |
| ⋮ | | ⋮ | ⋮ | ⋮ |
| ⋮ | ⋮ | ⋮ | ⋮ | ⋮ |

FIG. 10B

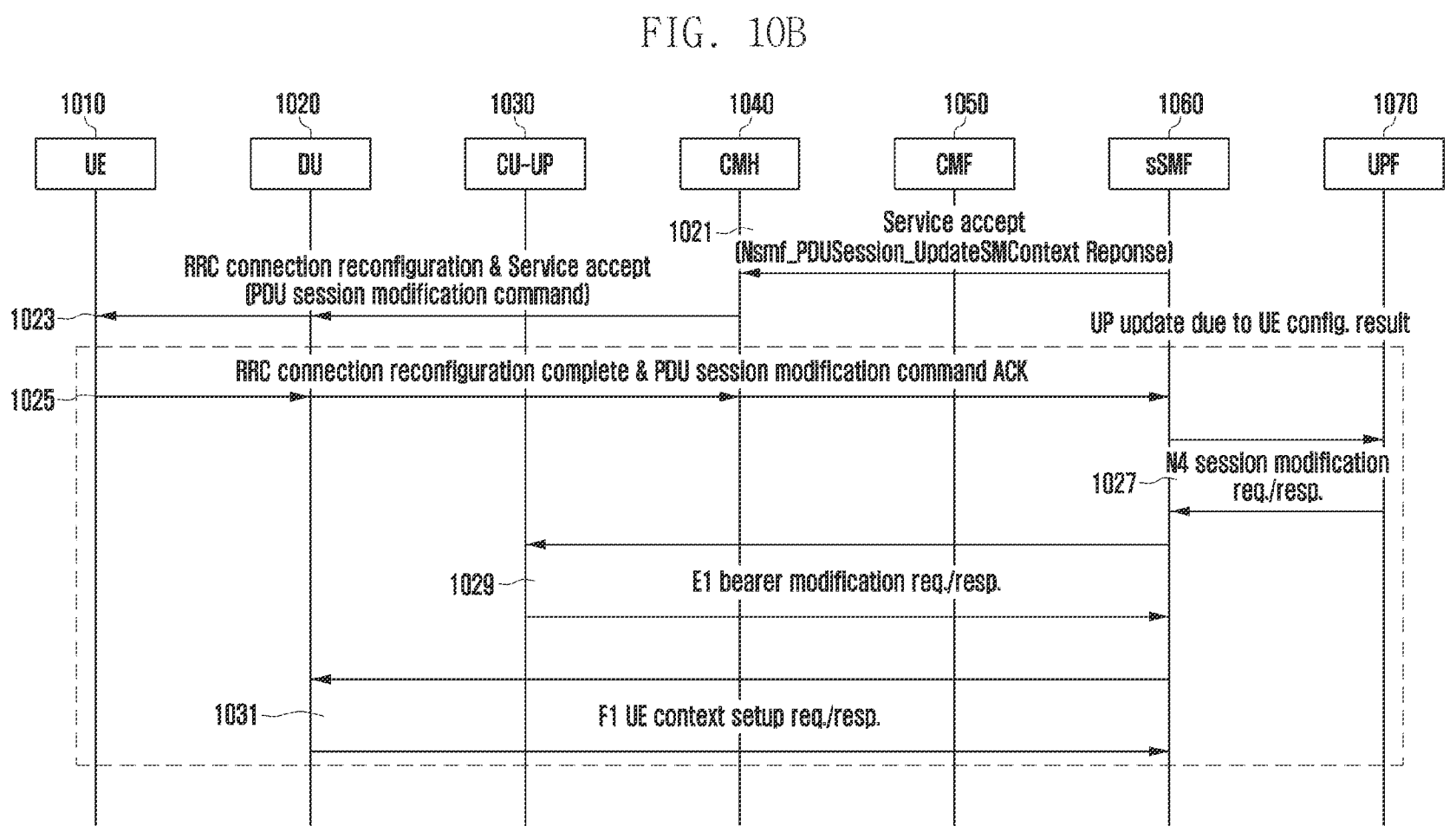

1010 UE
1020 DU
1030 CU-UP
1040 CMH
1050 CMF
1060 sSMF
1070 UPF

1021 Service accept (Nsmf_PDUSession_UpdateSMContext Reponse)
1023 RRC connection reconfiguration & Service accept (PDU session modification command)
1025 RRC connection reconfiguration complete & PDU session modification command ACK
UP update due to UE config. result
1027 N4 session modification req./resp.
1029 E1 bearer modification req./resp.
1031 F1 UE context setup req./resp.

FIG. 11A

UE
1210
DU
1220
CMH
1230
CU-CP
1240
CMF
1250
eSMF
1260
UPF
1270
UDM
1280
PCF
1290
PDU session establishment request
1201
UDM check
1203
SM policy association
1205
N4 session establishment request
1207
N4 session establishment response
1209

METHOD AND DEVICE FOR OPERATING WIRELESS-CORE CONVERGED CONTROL PLANE IN WIRELESS COMMUNICATION SYSTEM

PRIORITY

This application is a National Phase Entry of PCT International Application No. PCT/KR2022/010693, which was filed on Jul. 21, 2022, and claims priority to Koren Patent Application Nos. 10-2021-0101612 and 10-2022-0055197, which were filed on Aug. 2, 2021, and May 4, 2022, respectively, the entire content of each of which is incorporated herein by reference.

TECHNICAL FIELD

The disclosure relates to a wireless communication system and, more particularly, to a device and an operating method thereof for reducing transmission overheads and delays of a control plane in a wireless communication system.

BACKGROUND ART

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as "beyond-5G" systems.

6G communication systems, which are expected to be implemented approximately by 2030, will have a maximum transmission rate of tera (1.000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time: a network technology for utilizing satellites, high-altitude platform stations (HAPS), and the like in an integrated manner; a network structure innovation technology for supporting mobile nodes B and the like and enabling network operation optimization and automation and the like: a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

A mobile communication system includes a user equipment (UE), a base station (radio access network: RAN) that controls a UE in a specific area and transmits data, based on a wireless connection, and a core network (CN) that manages one or more base stations and UEs connected thereto and transmits data in a wide area, based on a wired connection. The mobile communication system has evolved to secure mutual independence by dividing the entire system into a control plane and a user plane, and to optimize and configure a device and a function to suit a purpose of each plane. In a 5G communication system, a base station device is defined to be divided into a distributed unit (DU) that includes medium access control (MAC) and radio link control (RLC) layers and a central unit (CU) that includes packet data convergence protocol (PDCP) and radio resource control (RRC) layers and manages one more DUs, and the CU is defined to be implemented and to easily operate on a wired cloud through application of virtualization technology, similarly to existing core network functions. In a case of a control plane mentioned in the disclosure, in controlling a UE, an RRC layer located in a CU is defined to be responsible for a control signal in a RAN, and an access and mobility function (AMF) is defined to be responsible for a control signal in a CN.

DISCLOSURE OF INVENTION

Technical Problem

An aspect of the disclosure is to provide a device and an operating method for reducing transmission overheads and delays of a control plane by adopting a service-based interface (SBI), adopted in a 5G core network, to a base station to increase freedom of a connection between devices and to integrate essential transit points for a control signal.

Solution to Problem

To achieve the foregoing aspect of the disclosure, a method performed by a communication device in a wireless communication system may include: receiving a first control message including a control message delivery (CMD) layer header from a user equipment (UE); determining a destination of the first control message among a central unit of a base station and network functions (NFs), based on the CMD layer header; and transmitting a second control message related to the first message to the destination.

To achieve the foregoing aspect of the disclosure, a method performed by a user equipment (UE) in a wireless communication system may include: generating a first control message including a control message delivery (CMD) layer header that is a base for a communication device to determine a destination of the first control message among a central unit (CU) of a base station and network functions (NFs); and transmitting the first control message to the communication device.

To achieve the foregoing aspect of the disclosure, a communication device in a wireless communication system may include: a transceiver configured to transmit and receive a signal, and a processor connected to the transceiver, wherein the processor may be configured to receive a first control message including a control message delivery (CMD) layer header from a user equipment (UE), determine a destination of the first control message among a central unit of a base station and network functions (NFs), based on the CMD layer header, and transmit a second control message related to the first message to the destination.

To achieve the foregoing aspect of the disclosure, a user equipment (UE) in a wireless communication system may include: a transceiver configured to transmit and receive a signal; and a processor connected to the transceiver, wherein the processor may be configured to generate a first control message including a control message delivery (CMD) layer header that is a base for a communication device to determine a destination of the first control message among a central unit (CU) of a base station and network functions (NFs), and transmit the first control message to the communication device.

Advantageous Effects of Invention

According to a disclosed embodiment, there may be provided a method and a device for reducing transmission overheads and delays of a control plane in a wireless communication system.

Separate message end points through which a control message needs to necessarily pass due to separate control signal systems in a RAN and a CN operated in an existing mobile communication system structure are integrated into one CMH to shorten a path through which a control message is transmitted, thereby reducing a transmission delay. Further, operational overheads arising from redundant processing of control messages in existing end points are also reduced by processing messages in a single point.

Further, a CMD layer provides a unified format for control messages exchanged between a UE and a network, thus reducing complexity of the UE needing to generate messages in a plurality of formats.

Since control messages between the UE and a network function are exchanged only through the CMH, each network function may be independently defined as a functional unit. In case that deploying an NF, the NF may be disposed in an optimal location regardless of the locations of other network functions, thereby improving operational efficiency.

BRIEF DESCRIPTION OF DRAWINGS

FIG. 4 illustrates a control signal transmission method for session management in a proposed structure according to an embodiment of the disclosure;

FIG. 5 illustrates an embodiment of a protocol stack for transmitting a control signal:

FIG. 8 illustrates information managed by a CMH to utilize an NF distinguisher according to an embodiment of the disclosure;

MODE FOR THE INVENTION

Figure 1:
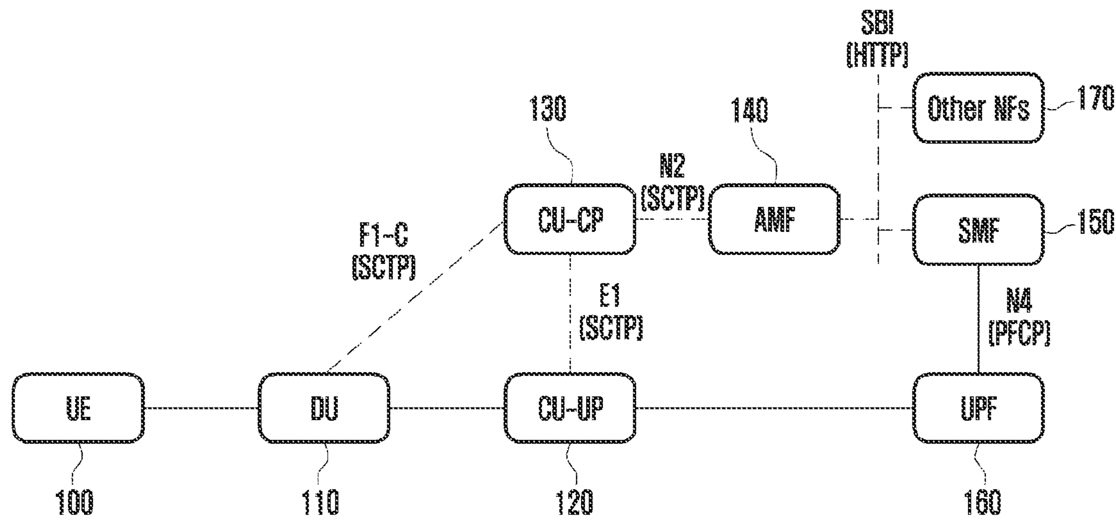
FIG. 1 illustrates an embodiment of a connection structure between devices in a mobile communication system.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted In case that it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

A mobile communication system includes a user equipment (UE), a base station (radio access network: RAN) that controls a UE in a specific area and transmits data, based on a wireless connection, and a core network (CN) that manages one or more base stations and UEs connected thereto and transmits data in a wide area, based on a wired connection. The mobile communication system has evolved to secure mutual independence by dividing the entire system into a control plane and a user plane, and to optimize and configure a device and a function to suit a purpose of each plane. In a 5G communication system, a base station device is defined to be divided into a distributed unit (DU) that includes medium access control (MAC) and radio link control (RLC) layers and a central unit (CU) that includes packet data convergence protocol (PDCP) and radio resource control (RRC) layers and manages one more DUs. and the CU is defined to be implemented and to easily operate on a wired cloud through application of virtualization technology, similarly to existing core network functions. In a case of a control plane mentioned in the disclosure, in controlling a UE, an RRC layer located in a CU is defined to be responsible for a control signal in a RAN, and an access and mobility function (AMF) is defined to be responsible for a control signal in a CN.

As described above, in a 5G mobile communication system, a CU of a base station has the same deployment characteristic of being able to operate on a wired cloud or server as that of core network functions, and there is a case where the CU and the core network functions are located physically in the same location in reality. However, unlike this change in deployment characteristic, the system still defines that control signals need to essentially pass through an RRC layer located in the CU at the base station and an AMF at a core network in case that a UE and a DU exchanges the control signals with a network. In addition, connections between the DU and the CU and between the CU and the AMF are defined as peer-to-peer (P2P) connections based on a stream control transmission protocol (SCTP). Considering that the AMF, which is one of the core network functions, and the CU, which is one of the base station devices, are physically located in the same space, this control signal delivery system increases the number of unnecessary transmission hops and a resulting transmission delay. Further, since the CU and the AMF are involved in transmission of all control signals, operational overhead increases, and these devices need to manage a large amount of user context.

An aspect of the disclosure is to solve the foregoing problems of the prior art by adopting a service-based interface (SBI), adopted in a 5G core network, to a base station to increase freedom of a connection between devices and to integrate essential transit points for a control signal, thereby providing a device and an operating method for reducing transmission overheads and delays of a control plane.

According to various embodiments of the disclosure, in an operating method of a base station including a DU including MAC and RLC layers and a CU including an RRC layer in a wireless communication system, there is provided a structure enabling the DU and the CU to directly exchange control signals with network functions (NFs) included in a core network, such an AMF, a session management function (SMF), and a policy control function (PCF), by using a service-based interface.

A UE and a network include a control message delivery (CMD) layer, the CMD layer of the network is located in a control message hub (CMH) device, and a CMH may be included in a DU or a CU among base station devices or disposed as a separate device, and may be configured as hardware or software.

Various embodiments of the disclosure provide a method in which a UE and a network exchange all control messages by using a control message in a single format used in a CMD layer and a method in which a CMH converts a control message of a UE into a message suitable for a service-based interface to transmit the message to other devices in a network or performs a reverse function. Further, provided is a method in which a CMH transmits a message including corresponding information in case that a control message of a UE sequentially requires operations or functions of a plurality of NFS.

FIG. 1 illustrates an embodiment of a connection structure between devices in a mobile communication system.

Referring to FIG. 1, a dotted line denotes a connection structure for exchanging a control signal between devices in the 5G mobile communication system. A central unit-control plane (CU-CP) 130 device responsible for a control plane in a RAN establishes SCTP-based P2P connections with user plane devices, such as a DU 110 and a central unit-user plane (CU-UP), in the RAN, and also forms an SCTP-based P2P connection with an AMF 140 responsible for transmitting control signals of a UE 100 and the RAN in a core network. Core network functions (i.e., NFs) including the AMF 140 and an SMF 150 may be configured to form a connection in a common bus format instead of a one-to-one connection by using a TCP/IP service-based interface (SBI), enabling all NFs to exchange a control signal according to granted authority and necessity. However, a user plane function (UPF) 160, which is a user plane device in the core network, forms a packet forwarding control protocol (PFCP)-based P2P connection with the SMF, which serves to control the same, to exchange a control signal.

In this structure, in case that the UE 100 wants to transmits a control message to an NF, the message may need to pass through the DU 110, the CU-CP 130, and the AMF 140 to be transmitted.

Figure 2:
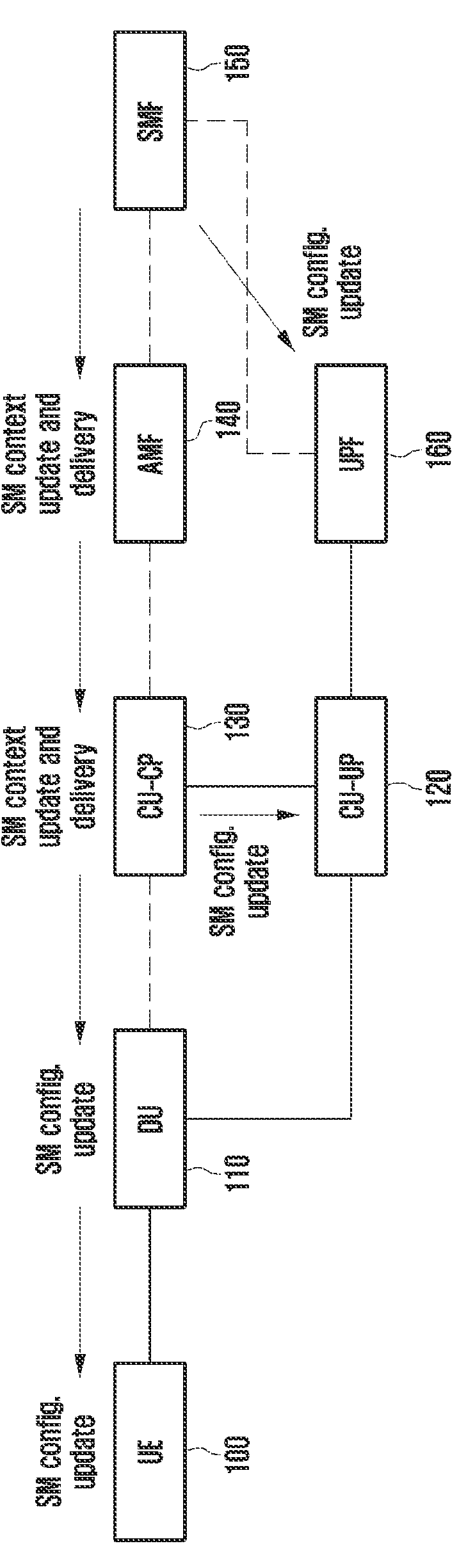
FIG. 2 illustrates an embodiment of a control signal transmission method for session management in a 5G system.

FIG. 2 illustrates an embodiment of a control signal transmission method for session management in a 5G system.

Referring to FIG. 2, in case that an SMF 150 responsible for session management configures a result of performing an operation in a network function, it is impossible to directly control a user plane device of a RAN, and the SMF 150 transmits a desired configured value to a CU-CP 130 through an AMF 140, after which the CU-CP 130 controls the user plane device. Further, in case that transmitting a configured value according to the result of the operation to a UE 100, the SMF 150 transmits the configured value via all of the AMF 140, the CU-CP 130, and a DU 110.

Figure 3:
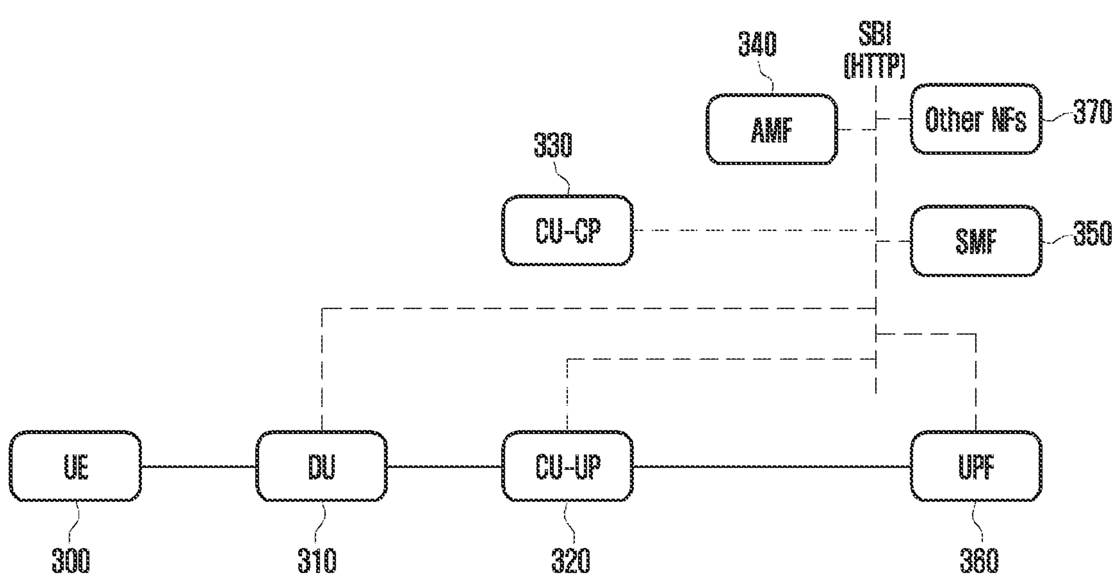
FIG. 3 illustrates a connection structure between devices in a mobile communication system according to an embodiment of the disclosure.

FIG. 3 illustrates a connection structure between devices in a mobile communication system according to an embodiment of the disclosure.

Referring to FIG. 3, a dotted line denotes a connection structure for exchanging a control signal between devices in the system proposed in the disclosure. Unlike the structure of the 5G mobile communication system described with reference to FIG. 1, all devices including a RAN, a CN, a control plane, and a user plane exchange control signals by using a service-based interface using a TCP/IP-based HTTP. Therefore, the proposed structure enables all base station devices and core network functions to exchange control signals with each other without going through other devices. Therefore, even in a case where a UE 300 wants to transmits a control message to an NF, the message may be transmitted directly to the NF as a destination without passing through another device in case that reaching a DU 310 through wireless section transmission, and NFs other than a CU-CP 330 and an SMF 350 may also directly control user plane devices of the base station and the core network as needed.

FIG. 4 illustrates a control signal transmission method for session management in a proposed structure according to an embodiment of the disclosure.

Referring to FIG. 4, an enhanced SMF (eSMF) 350, which functions similarly to the SMF 150 in FIG. 2 but has an added function of communication with a base station device, performs an operation and configures each user plane device, the eSMF 350 directly transmits a control signal without passing through an AMF 340 and a CU-CP 330, thereby directly configuring all user plane devices of a RAN and a CN. Further, in case that transmitting a configured value to a UE 300, the eSMF 350 may transmit the configured value without passing through devices other than a DU 310 through which the configured value needs to pass for wireless section transmission.

However, in reality, even though the connection structure between the devices is changed as shown in FIG. 3, network functions may not directly exchange control signals in a manner as illustrated in FIG. 4, because not only the connection structure between the devices described with reference to FIG. 1 but also a protocol structure for exchanging control signals between devices as illustrated in FIG. 5 is fixed in the 5G mobile communication system.

FIG. 5 illustrates an embodiment of a protocol stack for transmitting a control signal.

Referring to FIG. 5, as described above, a 5G mobile communication system is divided into a RAN and a CN, and an access stratum (AS) protocol, which is a control signal system of the RAN, is responsible for exchanging control signals between a UE 500 and an RRC layer of a base station. However, a control signal system of the CN is a non-access stratum (NAS), and includes a NAS-mobility management (NAS-MM) layer between the UE 500 and an AMF 530 and a NAS-session management (NAS-SM) layer between the UE 500 and an SMF 540. A NAS-SM control message is defined to be transmitted through the NAS-MM layer, which is a lower layer, as illustrated in FIG. 5, and a NAS-MM control message is defined to be transmitted through an AS layer. Based on a process in which the UE 500 transmits a control message to a network, the RRC layer located in a CU 520 of the base station primarily distinguishes whether the message of the UE 500 is an AS message or a NAS message, internally processes the AS message, and transmits the entire NAS message to the AMF 530, and the AMF 530 distinguishes whether the received NAS message is an MM message or an SM message and autonomously processes the same or transmits the same to an NF responsible for the corresponding laver. Therefore, to exchange control messages between NAS-SM layers of the UE 500 and the SMF 540, the messages need to pass through all of the AMF 530, the CU 520, and a DU 510, where lower layers are located, to be transmitted.

Figure 6:
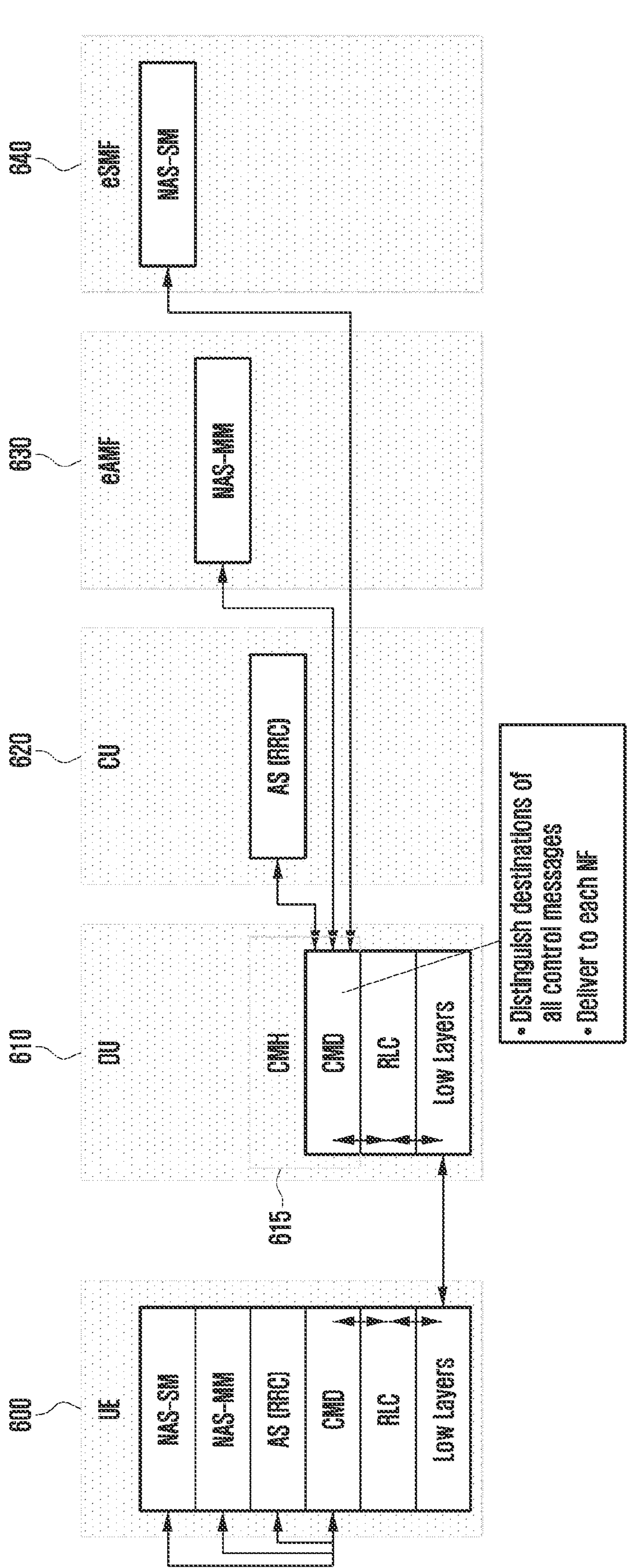
FIG. 6 illustrates a protocol stack for transmitting a control signal according to an embodiment of the disclosure.

FIG. 6 illustrates a protocol stack for transmitting a control signal according to an embodiment of the disclosure.

Referring to FIG. 6, a CMD layer responsible for exchanging a control message may include a role performed by an existing PDCP layer, and a CMH 615 including the CMD layer may be integrated into a DU 610 in a network. In addition to this example, the CMD layer may be defined and configured separately from a PDCP layer, and the CMH 615 may be integrated into a CU 620 rather than the DU 610 or be independently configured between the DU 610 and CU 620 to process control messages from a plurality of DUs 610. In the example, the CMD layer generates a separate service access point (SAP) for all upper layers including RRC, NAS-MM, and NAS-SM layers to directly communicate. Therefore, in case that layers exchange control signals for a service for which the layers are responsible between the UE 600 and the network, the layers may exchange the signals via only the CMD layer except for lower layers (from a physical layer to an RLC layer) required for wireless section transmission of the signals. In case that the CMH 615 receives a control message from the UE 600 while the UE 600 transmits the control message to the network, the CMH 615 identifies an NF to which the message needs to be transmitted and a service to be invoked among services provided by the NF, converts the message into a form suitable for a SBI, and directly invokes the service of the NF as a service customer. That is, the CMH 615 may receive the control message from the UE 600, and may determine, based on the control message, whether to transmit the control message to the CU 620 of the base station or which NF (e.g., an AMF 630 and an SMF 640) the control message is transmitted to. For example, the CMH 615 may obtain information about the service that the UE 600 invokes, based on the control message received from the UE 600, and may determine an NF to which the control message transmitted by the UE 600 is transmitted among NFs providing the service.

On the contrary, in case that the network transmits a control message to the UE 600, each NF transmits the control message to the CMH 615 by invoking a service provided by the CMH 615 to transmit a message to the UE 600, and the CMH 615 receiving the control message converts the control message into a message format used in the CMD layer to transmit the same to the UE 600. The CMH 615 also provides a service of transmitting a message for configuring layers of the base station in addition to the service of transmitting the control message to the UE 600, and each NF may directly control each layer of the base station by invoking the service in case that necessary.

To enable the foregoing exchange of control signals between the UE 600 and the network, a destination to which each control message is transmitted may need to be distinguished based on a single-format message instead of using an existing signal system that is separated into an AS and a NAS.

Figure 7:
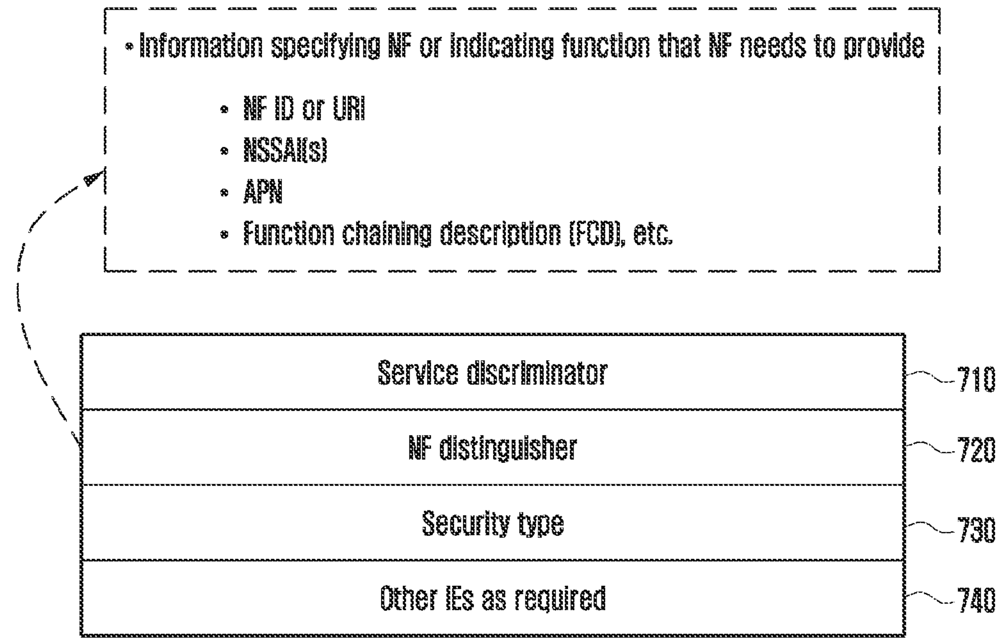
FIG. 7 illustrates a control message header of a CMD layer according to an embodiment of the disclosure.

FIG. 7 illustrates a control message header of a CMD layer according to an embodiment of the disclosure. FIG. 7 shows an example of a message header used for a CMH to classify and efficiently transmit control messages.

Referring to FIG. 7, the header of the CMD layer may include a service discriminator 710, an NF distinguisher 720, a security type 730, and the like.

The service discriminator 710 includes identification information about a service to be invoked by a control message. For example, the service discriminator 710 is information for specifying a service to be invoked among various services, such as a PDU session establishment request or an inter-gNB handover request, provided by each network function, and may be included in various forms including a bit string or plain text. The CMH may distinguish the type of an NF to be invoked, based on the service discriminator, but in case that there is a plurality of NFs of the type in a network, the CMH is unable to specify an NF to be invoked. Since the PDU session establishment request is a service provided by an SMF in the network, the CMH may identify that a control message received from a UE needs to be transmitted to the SMF, based on a service discriminator of the control message. However, in case that there is a plurality of SMFs in the network, the CMH is unable to exactly know which SMF instance an SMF in charge of the UE or a corresponding session is. To distinguish the SMF, the control message header includes the NF distinguisher 720. The NF distinguisher may include any information for specifying a destination to which the control message needs to be transmitted in case that there is a plurality of NF instances of the same type, such as an NF ID, a uniform resource identifier (URI), network slice selection assistance information (NSSAI) that may include information about a network slice to which the control message belongs, or an access point name (APN). That is, the NF distinguisher 720 may include information useful to specify an NF in addition to an NF ID that directly indicates an NF. Further, the NF distinguisher 720 may include information related to a function chaining description (FCD).

FIG. 8 illustrates information managed by a CMH to utilize an NF distinguisher according to an embodiment of the disclosure.

Referring to FIG. 8, the CMH may manage pieces of information for specifying the type and instance of an NF to which a control message is transmitted, based on a service discriminator and an NF distinguisher included in the message. For example, the CMH may specify the type and instance of an NF to which a message is transmitted, based on information, such as a service discriminator, an NF type, instance lists, an address, or a note.

Figure 9A:
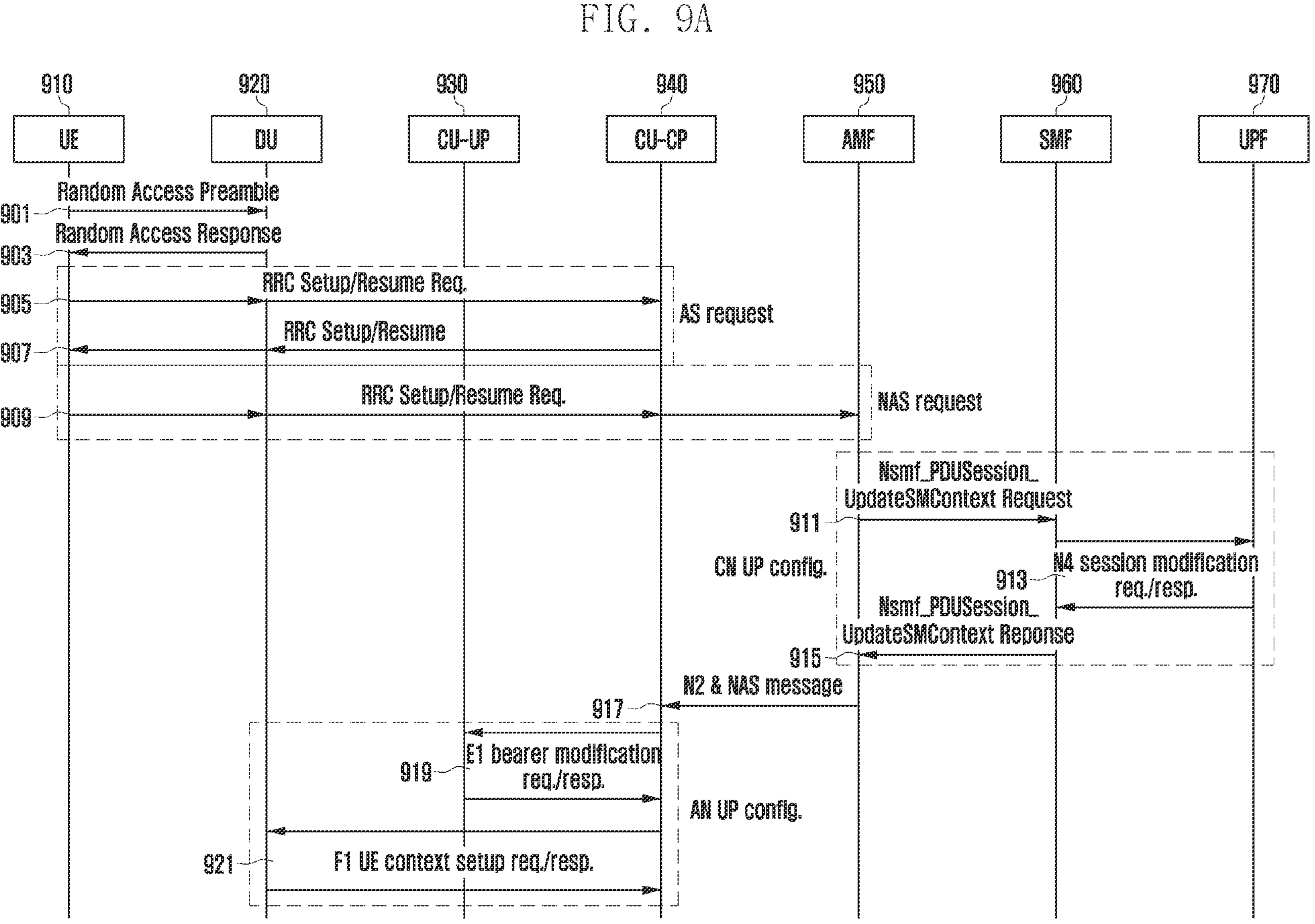
FIG. 9 illustrates an embodiment of a service request control procedure in a 5G system structure.
Figure 9B:
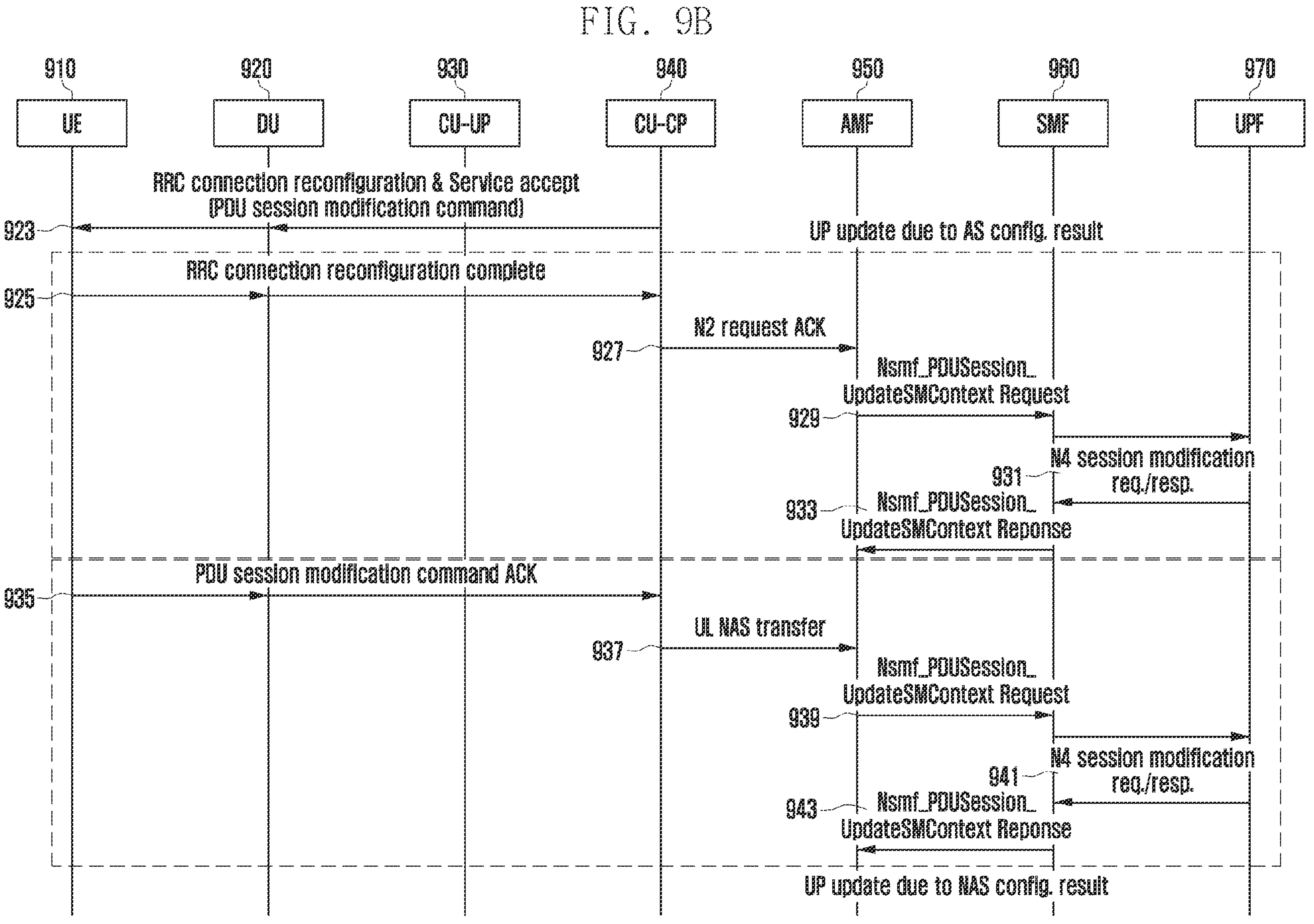

FIG. 9 illustrates an embodiment of a service request control procedure in a 5G system structure.

Referring to FIG. 9, since a RAN and a CN are separated in the existing structure, a UE 910 separately performs a NAS request for establishing a control connection with the CN after completing an AS request for establishing a control connection with the RAN An SMF 960 performs an operation related to a data session connection, and controls user plane devices, in which a UPF 970 may be configured directly by the SMF 960, whereas a CU-UP 930 and a DU 920, which are user plane devices of a RAN, are configured indirectly via an AMF 950 and a CU-CP 940. Subsequently, the SMF 960 configures the UE 910, in which since AS and NAS signals are separately transmitted to the UE 910, there is a possibility that a configuration of a user plane device of a core network needs to be repeatedly changed according to a UE configuration result by an AS message and a UE configuration result by a NAS message.

The UE 910 may perform random access with the DU 920 (901 and 903). Subsequently, the UE 910 may exchange RRC setup/resume messages with the CU-CP 940 through the DU 920 (905 and 907). The UE 910 may transmit an RRC setup/resume complete message and/or a service request message to the AMF 950 through the DU 920 and the CU-CP 940 (909). The AMF 950 may transmit a PDU session request message to the SMF 960 (911). The SMF 960 may exchange session change request/response messages with the UPF 970 (913). The SMF 960 may transmit a PDU session response message to the AMF (915). The AMF 950 may transmit an N2 & NAS message to the CU-CP 940 (917). The CU-CP 940 may exchange E1 bearer modification request/response messages with the CU-UP 930 (919). The CU-CP 940 may exchange F1 UE context setup request/response messages with the DU 920 (921). The CU-CP 940 may transmit an RRC connection reconfiguration & service accept (PDU session modification command) message to the UE 910 through the DU 920 (923). The UE 910 may transmit an RRC connection reconfiguration complete message to the CU-CP 940 through the DU 920 (925). The CU-CP 940 may transmit an N2 request ACK message to the AMF 950 (927). The AMF 950 may transmit a PDU session request message to the SMF 960 (929). The SMF 960 may exchange session change request/response messages with the UPF 970 (931). The SMF 960 may transmit a PDU session response message to the AMF (933). The UE 910 may transmit a PDU session modification command ACK message to the CU-CP 940 through the DU 920 (935). The CU-CP 940 may transmit a UL NAS transfer message to the AMF 950 (937). The AMF 950 may transmit a PDU session request message to the SMF 960 (939). The SMF 960 may exchange session change request/response messages with the UPF 970 (941). The SMF 960 may transmit a PDU session response message to the AMF (943).

Figure 10A:
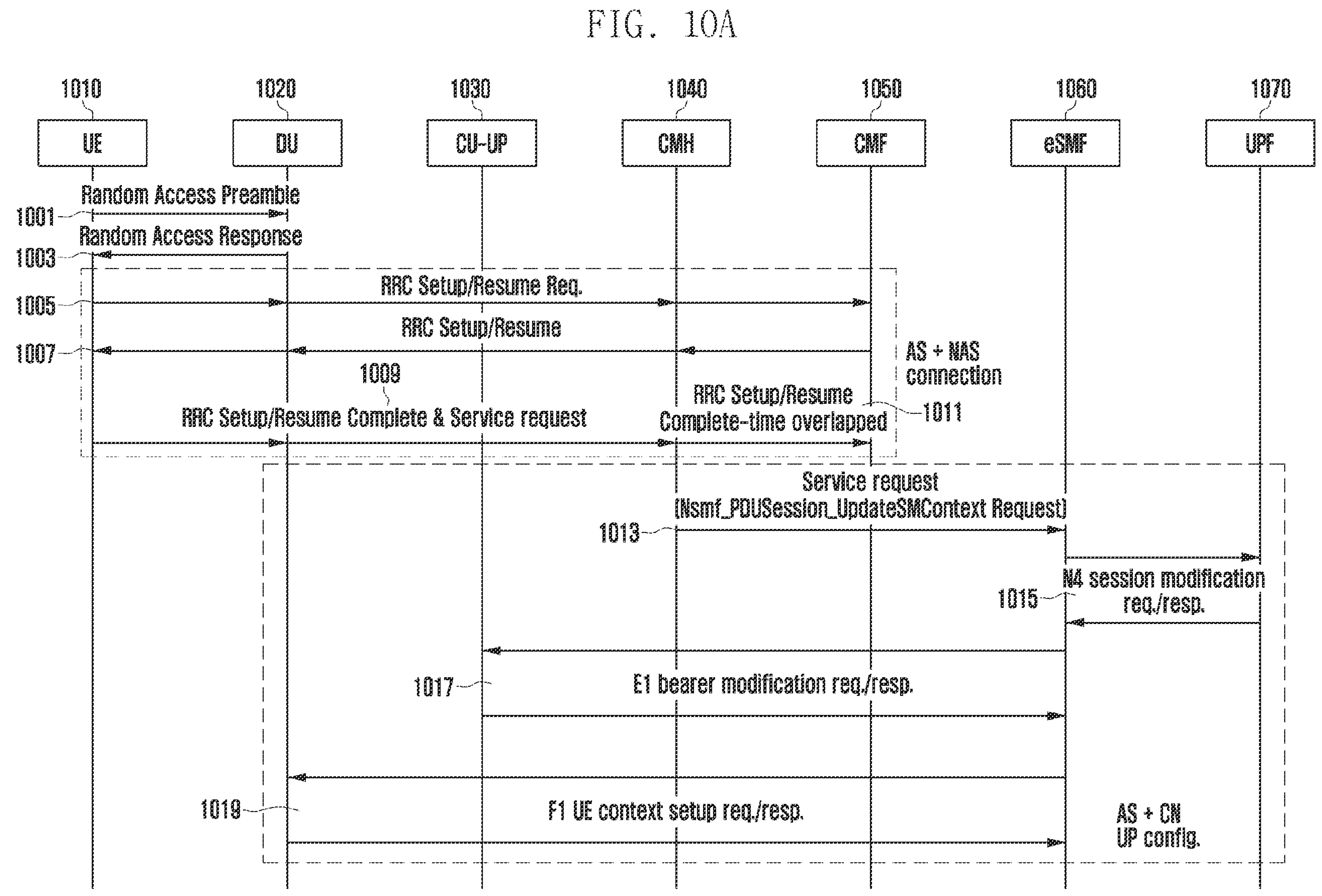
FIG. 10 illustrates a service request control procedure in a proposed structure according to an embodiment of the disclosure.

FIG. 10 illustrates a service request control procedure in a proposed structure according to an embodiment of the disclosure Entities of FIG. 10 may have the connection structure of FIG. 3 and FIG. 4.

Referring to FIG. 10, since the proposed structure uses a control message in a single format without distinguishing an AS and a NAS, a connection management function (CMF) 1050 responsible for a network connection of a UE 1010 without distinguishing a RAN and a CN may be defined. An eSMF 1060 has been improved to directly control user plane devices in the entire network. Accordingly, the UE 1010 may generate a control connection with the network through an exchange of control messages with the CMF 1050. In case that configuring a user plane device, the eSMF 1060 configures all user plane devices without going through other network functions. Subsequently, the eSMF 1060 transmits configuration information to the UE 1010, and the configuration information is transmitted to the UE 1010 without passing through other network functions except a CMH 1040 and a DU 1020. In case that the configuration information about the UE 1010 is applied, since the eSMF 1060 directly identifies results of all user plane devices and then transmits configuration content of the UE 1010, reconfiguration of a user plane device of the network is required only in case that configuration of the UE 1010 fails.

The UE 1010 may perform random access with the DU 1020 (1001 and 1003). Subsequently, the UE 1010 may exchange RRC setup/resume messages with the CMF 1050 through the DU 1020 and the CMH 1040 (1005 and 1007). The UE 1010 may transmit an RRC setup/resume complete message and a service request message to the CMH 1040 through the DU 1020 (1009). The CMH 1040 may transmit the RRC setup/resume complete message to the CMF 1050 (1011). The CMF 1040 may transmit a service request message (e.g., a PDU session request message) to the eSMF 1060 (1013). The eSMF 1060 may exchange N4 session modification request/response messages with a UPF 1070 (1015). The eSMF 1060 may exchange E1 bearer modification request/response messages with a CU-UP 1030 (1017). The eSMF 1060 may exchange F1 UE context setup request/response messages with a DU 1020 (1019). The eSMF 1060 may transmit a PDU session response message to the CMH 1040 (1021). The CMH 1040 may transmit an RRC connection reconfiguration & service accept (PDU session modification command) message to the UE 1010 through the DU 1020 (1023). The UE 1010 may transmit an RRC connection reconfiguration complete & PDU session modification command ACK message to the eSMF 1060 through the DU 1020 and the CMH 1040 (1025).

The eSMF 1060 may exchange N4 session modification request/response messages with the UPF 1070 (1027). The eSMF 1060 may exchange E1 bearer modification request/response messages with the CU-UP 1030 (1029). The eSMF 1060 may exchange F1 UE context setup request/response messages with the DU 1020 (1031).

Figure 11A:
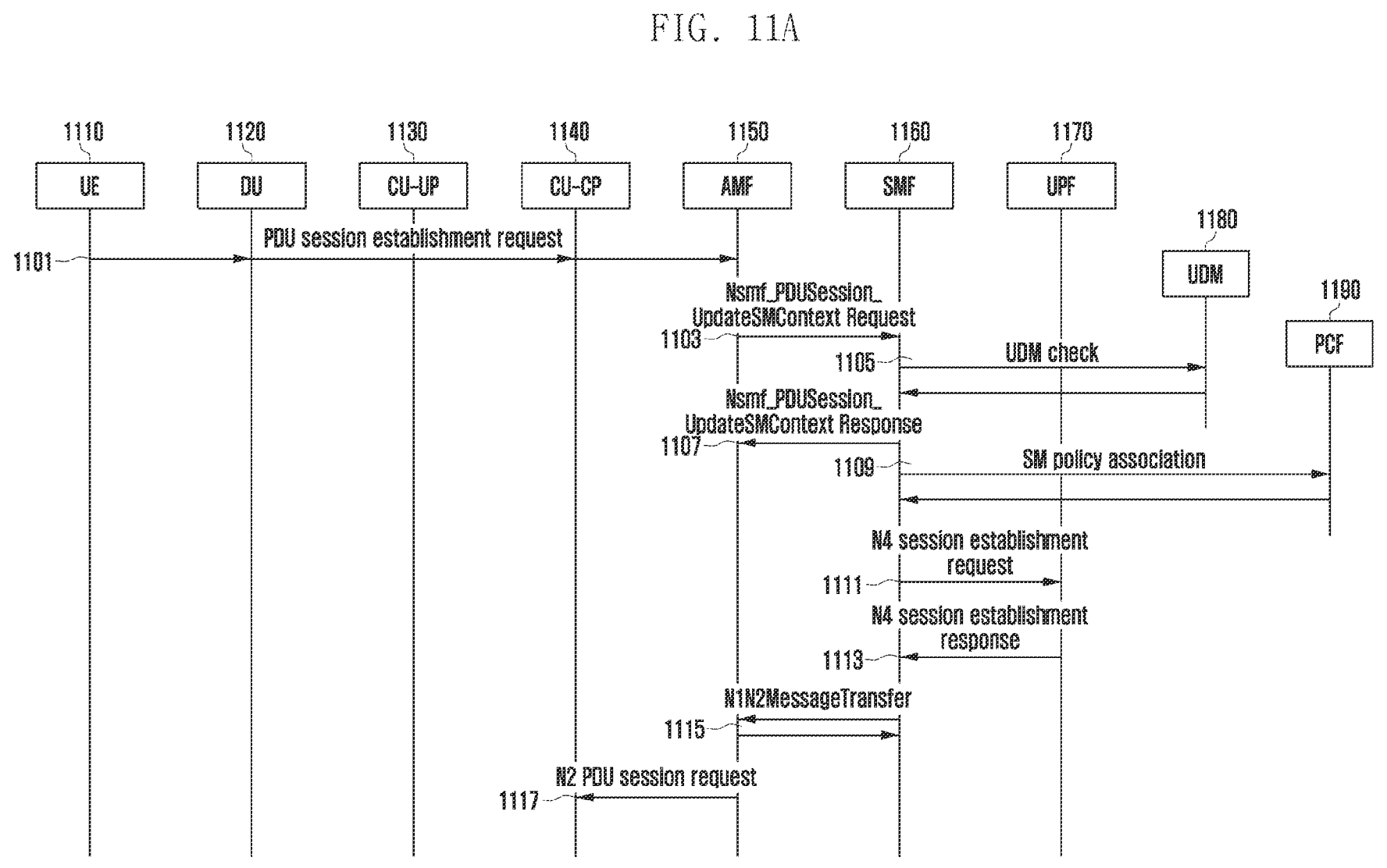
Figure 11B:
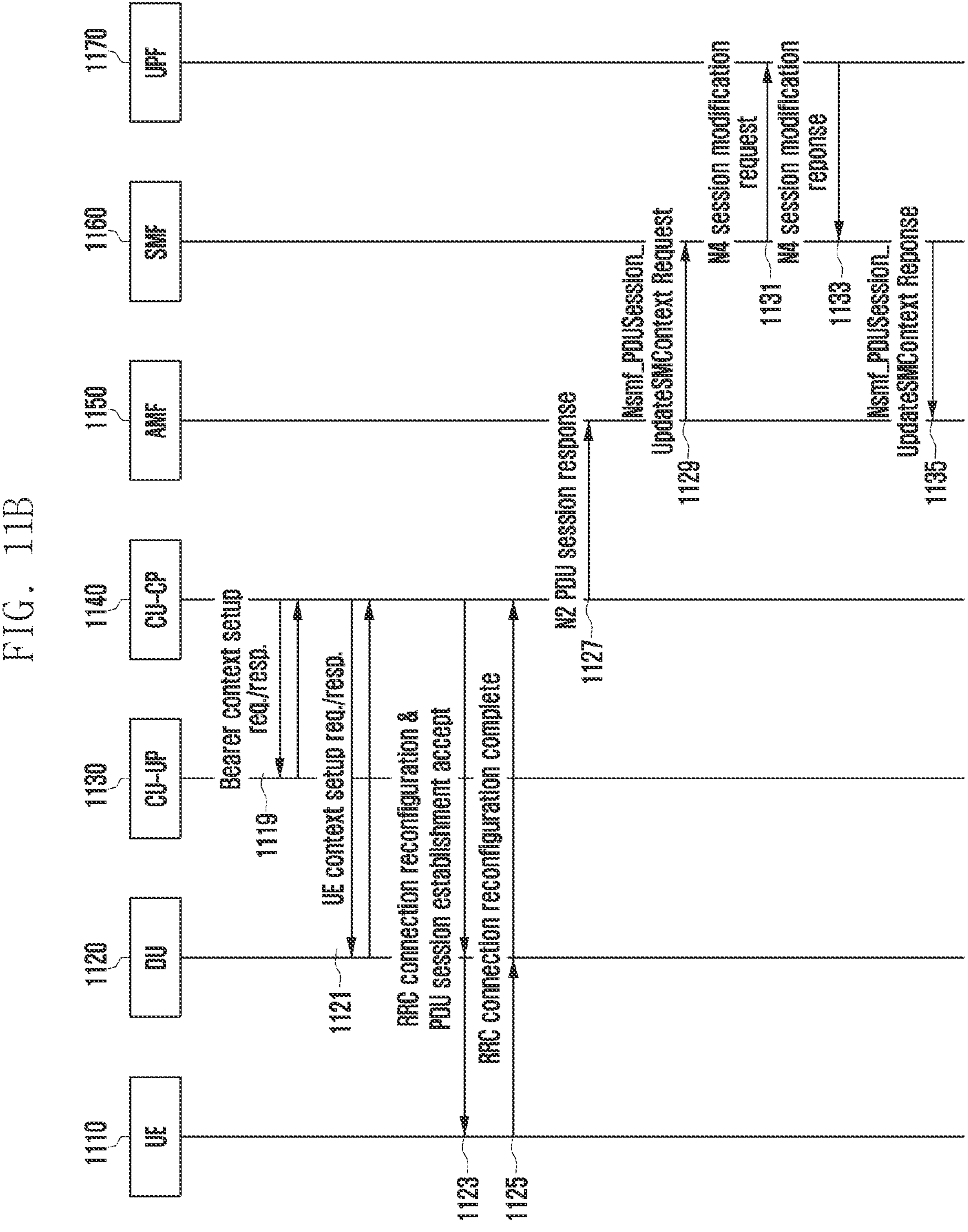
FIG. 11 illustrates an embodiment of a PDU session establishment control procedure in a 5G system structure.

FIG. 11 illustrates an embodiment of a packet data unit (PDU) session establishment control procedure in a 5G system structure.

The PDU session establishment procedure is a procedure in which a UE 1110 requests establishment of a user plane connection for data transmission, and is a control procedure that requires an operation of an SMF 1160, which is an NF responsible for session management, and configuration of user plane devices. In the existing structure of FIG. 11, not only a request from the UE 1110 is transmitted via a CU-CP 1040 and an AMF 1150 in case that transmitted to an SMF 1160, but also the SMF 1160 indirectly configures an RAN user plane device by transmitting configuration information to the CU-CP 1140 in case that performing an operation and configuring the RAN user plane device. Thus, in case that the RAN user plane device fails to be configured, there is a possibility that a result needs to be transmitted back to the SMF 1160 through the AMF 1150 and then reconfiguration needs to be performed.

The UE 1110 may transmit a PDU session establishment request message to the AMF 1150 through a DU 1120 and the CU-CP 1140 (1101). The AMF 1150 may transmit a PDU session request message to the SMF 1160 (1103). The SMF 1160 may exchange UDM check messages with a UDM 1180 (1105). The SMF 1160 may transmit a PDU session response message to the AMF 1150 (1107). The SMF 1160 may exchange SM policy association messages with a PCF 1190 (1109). The SMF 1160 may transmit an N4 session establishment request message to a UPF 1170 (1111). The UPF 1170 may transmit an N4 session establishment response message to the SMF 1160 (1113). The SMF 1160 may exchange N1N2Message with the AMF 1150 (1115). The AMF 1150 may transmit an N2 PDU session request message to the CU-CP 1140 (1117). The CU-CP 1140 and a CU-UP 1130 may exchange bearer context setup request/response messages (1119) The DU 1120 may exchange UE context setup request/response messages with the CU-CP 1140 (1121). The CU-CP 1140 may transmit an RRC connection reconfiguration & PDU session establishment accept message to the UE 1110 through the DU 1120 (1123). The UE 1110 may transmit an RRC connection reconfiguration complete message to the CU-CP 1140 through the DU 1120 (1125). The CU-CP 1140 may transmit an N2 PDU session response message to the AMF 1150 (1127). The AMF 1150 may transmit a PDU session request message to the SMF 1160 (1129) The SMF 1160 may transmit an N4 session modification request message to the UPF 1170 (1131), and the UPF 1170 may transmit an N4 session modification response message to the SMF 1160 (1133). The SMF 1160 may transmit a PDU session response message to the AMF 1150 (1135).

Figure 12A:
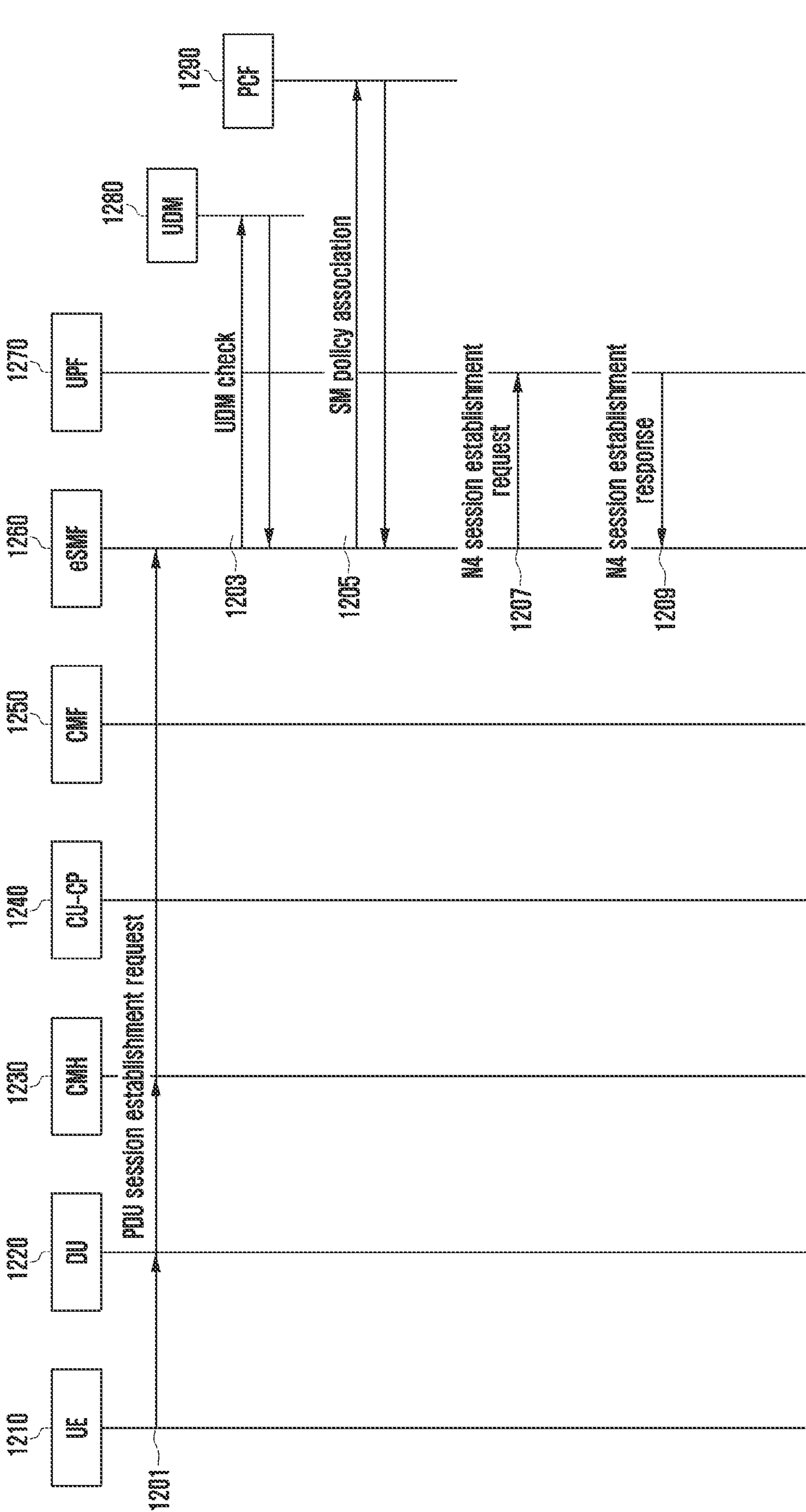
FIG. 12 illustrates a PDU session establishment control procedure according to an embodiment of the disclosure.
Figure 12B:
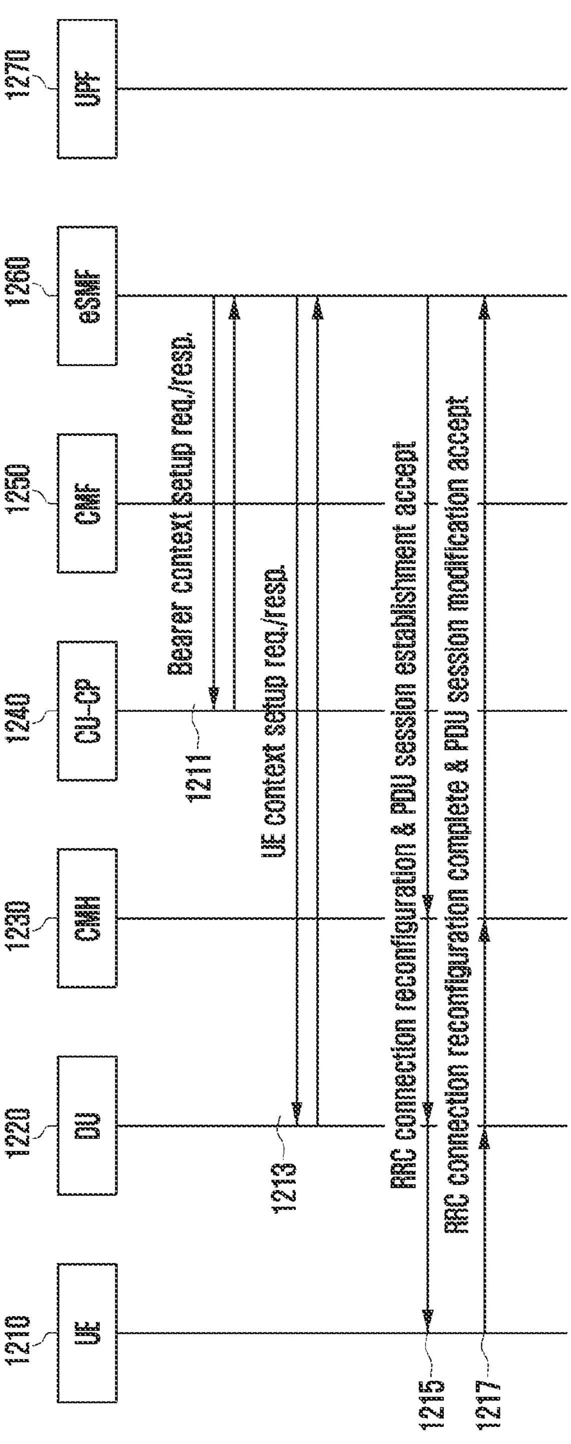

FIG. 12 illustrates a PDU session establishment control procedure according to an embodiment of the disclosure. Entities of FIG. 12 may have the connection structure of FIG. 3 and FIG. 4.

Referring to FIG. 12, in the proposed structure, a request from a UE 1210 is transmitted directly to an eSMF 1260 via only a CMH 1230, and a CMF 1250 responsible for a user's connection does not intervene in a corresponding control procedure. As in FIG. 10, since the eSMF 1260 directly manages all user plane devices, performs an operation, and configures the user plane devices, configuration of all user plane devices is stably completed at a time of transmitting a configuration to the UE 1210, and there is no possibility of reconfiguration.

The UE 1210 may transmit a PDU session establishment request message to the eSMF 1260 through a DU 1220 and the CMH 1230 (1201). The eSMF 1260 may exchange UDM check messages with a UDM 1280 (1203). The eSMF 1260 may exchange SM policy association messages with a PCF 1290 (1205). The eSMF 1260 may transmit an N4 session establishment request message to a UPF 1270 (1207). The UPF 1270 may transmit an N4 session establishment response message to the eSMF 1260 (1209). The eSMF 1260 may exchange bearer context setup request/response messages with a CU-CP 1240 (1211). The eSMF 1260 may exchange UE context setup request/response messages with the DU 1220 (1213).

The eSMF 1260 may transmit an RRC connection reconfiguration & PDU session establishment accept message to the UE 1210 through the CMH 1230 and the DU 1220 (1215). The UE 1210 may transmit an RRC connection reconfiguration complete & PDU session modification accept message to the eSMF 1260 through the DU 1220 and the CMH 1230 (1217).

The procedures of FIG. 9 to FIG. 12 show a case where an operation of a specific network function includes an exchange of control signals with a plurality of network functions. FIG. 13 to FIG. 16 simply schematizes the case.

Figure 13:
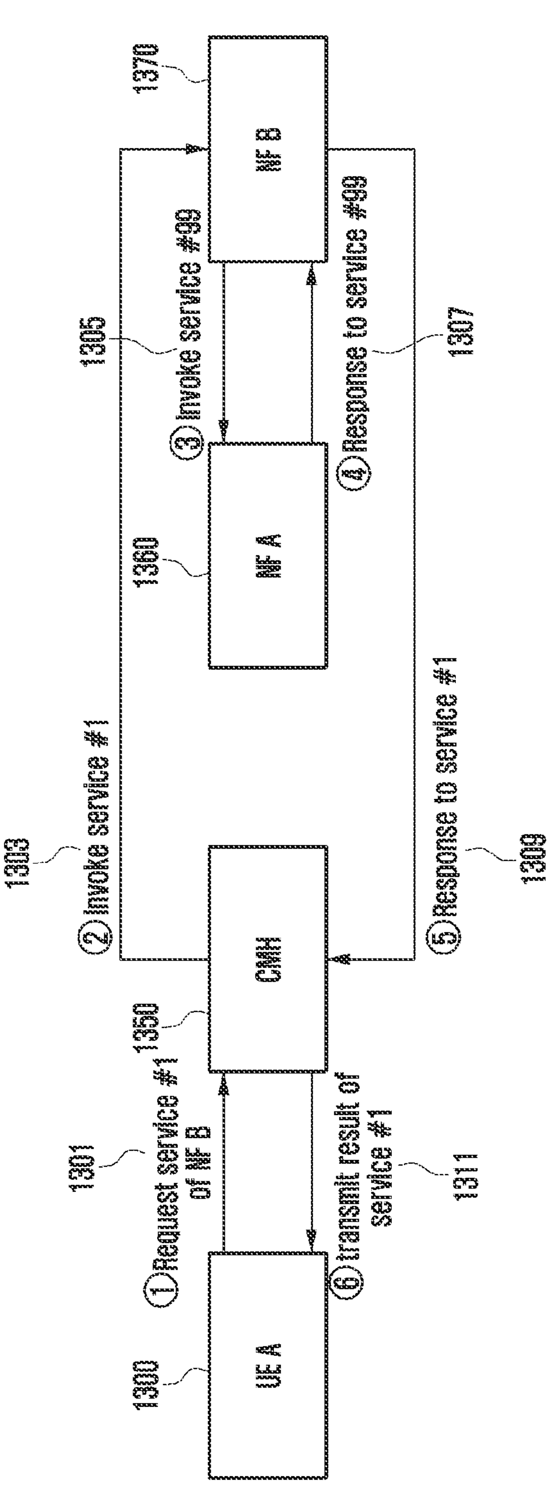
FIG. 13 illustrates an embodiment of a request-response service provision procedure.

FIG. 13 illustrates an embodiment of a request-response service provision procedure.

Referring to FIG. 13, in case that UE A 1300 requests service #1 provided by NF B 1370 (1301), a CMH 1350 invokes service #1 of NF B 1370, based on a received message (1303). In case that NF B 1370 needs to invoke service #99 of NF A 1360 to process the service (1305), NF B 1370 needs to invoke the service and wait for a response (1307), which causes a delay in overall service time. Subsequently, the CMH 1350 may receive a response to service #1 from NF B 1370 (1309). The CMH 1350 may transmit a result of service #1 to UE A 1300 (1311).

To reduce a delay by efficiently transmitting necessary information between NFs, a control message header used in a CMD layer described above may include a function chaining description (FCD) that specifies an NF to receive a response to an invoked service.

Figure 14:
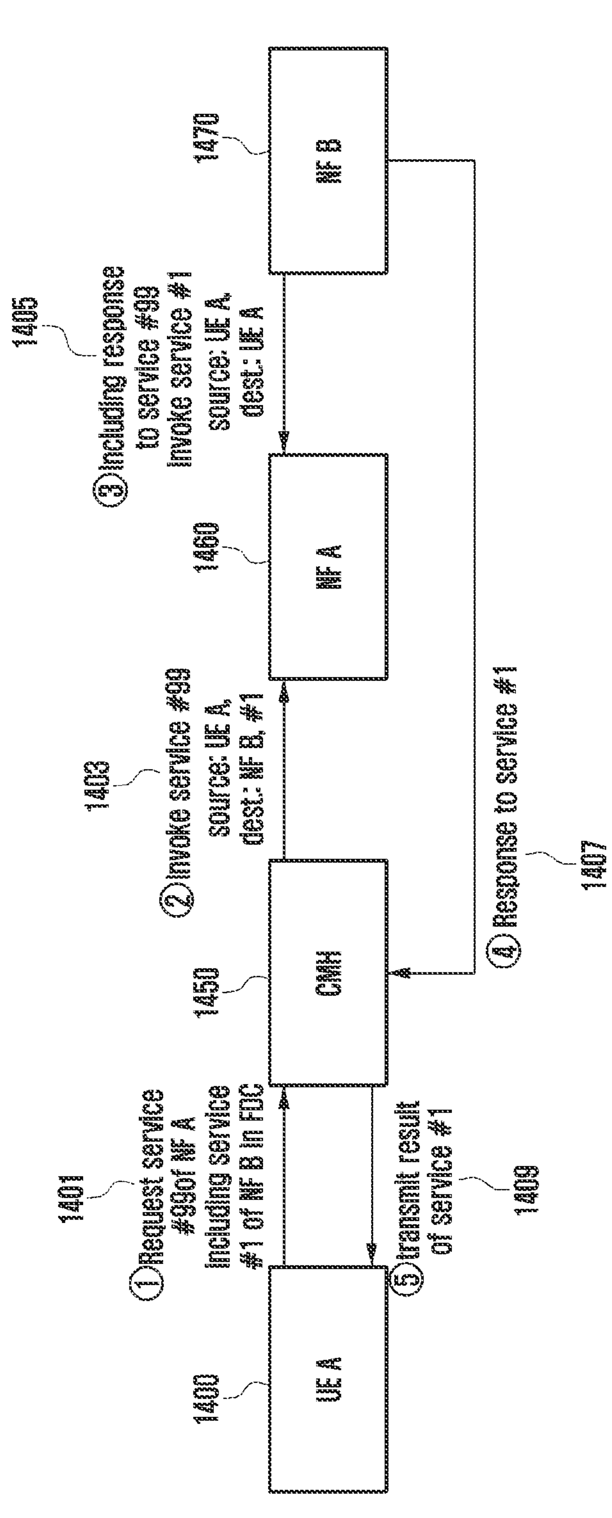
FIG. 14 illustrates a service provision procedure In case that an FCD is applied according to an embodiment of the disclosure.

FIG. 14 illustrates a service provision procedure in case that an FCD is applied according to an embodiment of the disclosure.

Although FIG. 14 shows a case where UE A 1400 ultimately requests service #1 of NF B 1470 as in FIG. 13, UE A 1400 requests that service #99 of NF A 1460 be invoked and transmit an FCD configured such that a response thereto is transmitted by invoking #1 of NF B 1470 in case that transmitting a request (1401). A CMH 1450 receiving this message invokes service #99 of NF A 1460, including information that a destination to receive a response to the request is service #1 of NF B 1470 (1403). NF A 1460 receiving a service request invokes service #1 of NF B 1470 that is the destination, including a response detail, instead of transmitting the response back to the CMH 1450 as in a general request-response method (1405).

Accordingly, service #1 of NF B (1470) is finally invoked, and in this process, overall response waiting time may be reduced, and the number of control signal exchanges may also be reduced. The FCD may include one or more receiving NFs and services, and the included NFs and services may sequentially form a message delivery chain to deliver necessary information. NF B 1470 may transmit a response to service #1 to the CMH 1450 (1407). The CMH 1450 may transmit a result of service #1 to UE A 1400 (1409).

For various network functions in a network to exchange control messages through a CMH described above, the CMH and NFs need to be able to invoke each other's services. To this end, the CMH needs to be able to register connection information thereof and services provided for each NF in a network repository function (NRF), and the NRF needs to provide a service to enable other network functions to retrieve an appropriate CMH. Further, in case that registering a service in the NRF, each NF may register a service to be invoked by the CMH. Accordingly, the NF and the CMH may establish a mutual service producer-service consumer relationship, the NF may recognize a message received from the CMH, and the CMH may recognize a message received from each NF. To this end, the NRF, which provides registration and discovery services for existing CN devices, provides a RAN management service for registration and discovery of a RAN device.

Figure 15:
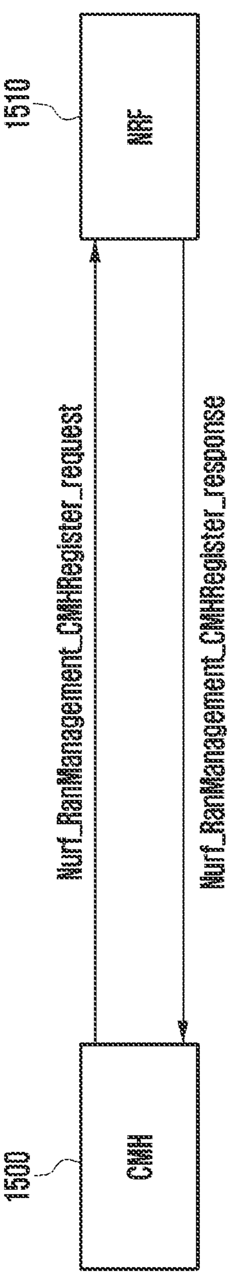
FIG. 15 illustrates a procedure in which a CMH registers with an NRF according to an embodiment of the disclosure.

FIG. 15 illustrates a procedure in which a CMH registers with an NRF according to an embodiment of the disclosure.

Referring to FIG. 15, the NRF 1510 may provide a CMH register service that the CMH 1500 may invoke to register the CMH 1500. For example, the CMH 1500 may transmit a Nurf_RanManagement_CMHRegister_request message to the NRF 1510, and the NRF 1510 may transmit a Nurf_RanManagement_CMHRegister_response message to the CMH 1500. Information included in registration includes an ID of the CMH 1500, a physical access address, such as an FQDN or IP address, a list of provided services, a PLMN ID, and the like, that is, a network to which the CMH 1500 belongs, a service provided by the network, and a method for access to the network. Further, the following wireless transmission information and slice information may also be included in registration to enable other network functions to retrieve a CMH responsible for a slice or cell that meets a specific condition. For example, the information included in registration may include radio access technology (RAT) information, such as LTE or 5G, a supported frequency band, a cell ID, a cell location, a cell type (indoor/outdoor/macro/small/pico), a supported It S-NSSAI list, a connected DNN list, and the like.

Figure 16:
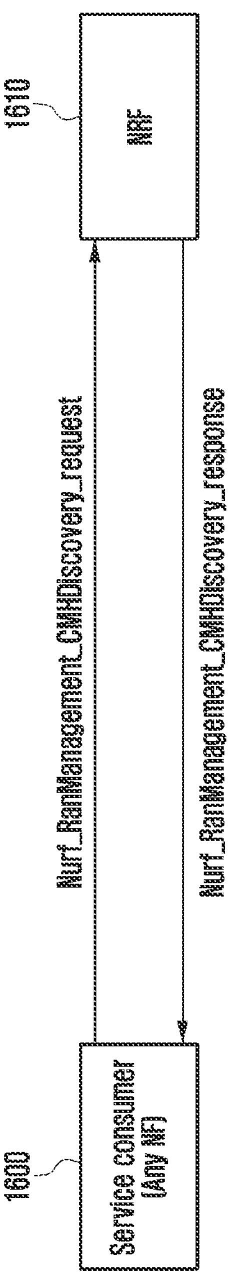
FIG. 16 illustrates a procedure in which an NF retrieves a CMH in an NRF according to an embodiment of the disclosure.

FIG. 16 illustrates a procedure in which an NF retrieves a CMH in an NRF according to an embodiment of the disclosure.

Referring to FIG. 16, the NRF 1610 provides a service enabling network functions 1600 to retrieve a desired CMH. For example, a service consumer (any NF) 1600 may transmit a Nurf_RanManagement_CMHDiscovery_request message to the NRF 1610, and the NRF 1610 may transmit a Nurf_RanManagement_CMHDiscovery_response message to the CMH 1600.

Information included to retrieve a specific CMH may include a CMH ID and a name of a service to be invoked. In addition, to retrieve a CMH that meets a desired condition, it is also possible to retrieve a CMH by using some of information, such as an S-NSSAI, a DNN, a PLMN ID, RAT, a frequency band, a cell ID, a cell type, and a cell location.

Figure 17:
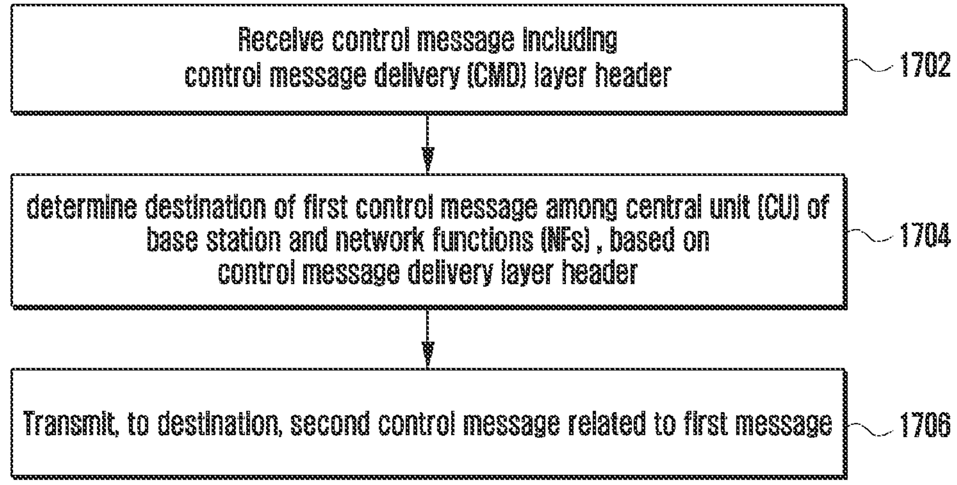
FIG. 17 illustrates an operation of a communication device according to an embodiment of the disclosure.

FIG. 17 illustrates an operation of a communication device according to an embodiment of the disclosure.

Referring to FIG. 17, the communication device may be a DU including a CMD layer, or may be a CMH independent of a DU including a CMD layer. In this specification, a CMH may exist separately from a DU, or may exist in a form of being included in a DU.

The communication device may receive a control message including a control message delivery (CMD) layer header (1702). A CMD layer responsible for exchanging a control message may include a role performed by an existing PDCP layer, and a CMH including the CMD layer may be integrated into a DU in a network. The CMD layer generates a separate service access point (SAP) for all upper layers including RRC, NAS-MM, and NAS-SM layers to directly communicate Therefore, in case that layers exchange control signals for a service for which the layers are responsible between a UE and the network, the layers may exchange the signals via only the CMD layer except for lower layers (from a physical layer to an RLC layer) required for wireless section transmission of the signals. The CMD layer header may include a service discriminator, an NF distinguisher, a security type, and the like. The service discriminator includes identification information about a service to be invoked by a control message. For example, the service discriminator is information for specifying a service to be invoked among various services, such as a PDU session establishment request or an inter-gNB handover request, provided by each network function, and may be included in various forms including a bit string or plain text. The CMH may distinguish the type of an NF to be invoked, based on the service discriminator, but in case that there is a plurality of NFs of the type in a network, the CMH is unable to specify an NF to be invoked. Since the PDU session establishment request is a service provided by an SMF in the network, the CMH may identify that a control message received from a UE needs to be transmitted to the SMF, based on a service discriminator of the control message. However, in case that there is a plurality of SMFs in the network, the CMH is unable to exactly know which SMF instance an SMF in charge of the UE or a corresponding session is. To distinguish the SMF, the control message header includes the NF distinguisher. The NF distinguisher may include any information for specifying a destination to which the control message needs to be transmitted in case that there is a plurality of NF instances of the same type, such as an NF ID, a uniform resource identifier (URI), network slice selection assistance information (NSSAI) that may include information about a network slice to which the control message belongs, or an access point name (APN). That is, the NF distinguisher may include information useful to specify an NF in addition to an NF ID that directly indicates an NF. Further, the NF distinguisher may include information related to a function chaining description (FCD).

The communication device may determine a destination of the first control message among a central unit (CU) of a base station and network functions (NFs), based on the CDM layer header (1704). In case that the CMH receives the control message from the UE while the UE transmits the control message to the network, the CMH may identify an NF to which the message needs to be transmitted and a service to be invoked among services provided by the NF, may convert the message into a form suitable for a SBI, and may directly invoke the service of the NF as a service customer. That is, the CMH may receive the control message from the UE, and may determine, based on the control message, whether to transmit the control message to the CU of the base station or which NF (e.g., an AMF and an SMF) the control message is transmitted to. For example, the CMH may obtain information about the service that the UE invokes, based on the control message received from the UE, and may determine an NF to which the control message transmitted by the UE is transmitted among NFs providing the service.

The communication device may transmit a second control message related to the first message to the destination (1706). That is, the communication device may receive the first control message, may convert the first control message into the form suitable for the SBI, based on the first control message, and may then directly invoke the service of the NF as the service consumer.

For example, the CMD layer header may include identification information about a first service to be invoked for the UE and information for determining the destination, and the information for determining the destination may include at least one of an identifier (ID) of an NF, a uniform resource identifier (URI), network slice selection assistance information (NSSAI) related to the first service, and an access point name (APN).

For example, in case that the second control message does not include the CMD layer header and the destination is one of the NFs, the second message may be transmitted through the service-based interface (SBI).

For example, the CMD layer header may include identification information about a first service to be invoked for the UE, and the destination may be determined as a first NF providing the first service.

For example, in case that a second service needs to be invoked to process the first service, a response message to the second control message may be transmitted from the first NF unit to a second NF unit providing the second service, and the communication device may further receive a response message to the second service from the second NF unit.

Figure 18:
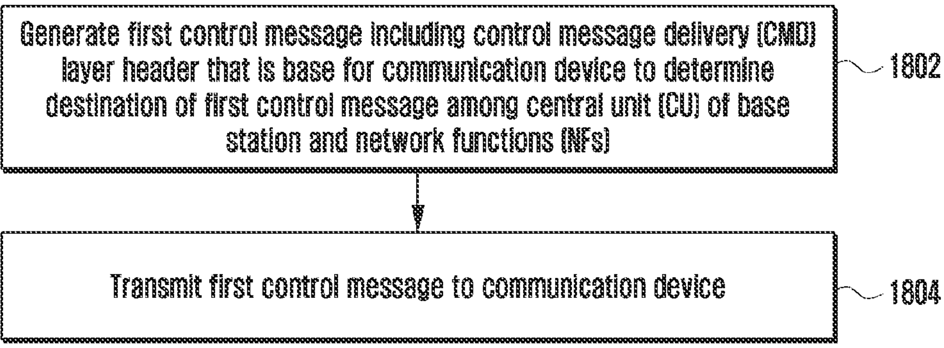
FIG. 18 illustrates an operation of a UE according to an embodiment of the disclosure.

FIG. 18 illustrates an operation of a UE according to an embodiment of the disclosure.

Referring to FIG. 18, a communication device may be a DU including a CMD layer, or may be a CMH independent of a DU including a CMD layer. In this specification, a CMH may exist separately from a DU, or may exist in a form of being included in a DU. The UE may include a UE according to this specification.

The UE may generate a first control message including a control message delivery (CMD) layer header that is a base for the communication device to determine a destination of the first control message among a central unit (CU) of a base station and network functions (NFs) (1802). A CMD layer responsible for exchanging a control message may include a role performed by an existing PDCP layer, and a CMH including the CMD layer may be integrated into a DU in a network. The CMD layer generates a separate service access point (SAP) for all upper layers including RRC. NAS-MM, and NAS-SM layers to directly communicate. Therefore, in case that layers exchange control signals for a service for which the layers are responsible between a UE and the network, the layers may exchange the signals via only the CMD layer except for lower layers (from a physical layer to an RLC layer) required for wireless section transmission of the signals. The CMD layer header may include a service discriminator, an NF distinguisher, a security type, and the like. The service discriminator includes identification information about a service to be invoked by a control message. For example, the service discriminator is information for specifying a service to be invoked among various services, such as a PDU session establishment request or an inter-gNB handover request, provided by each network function, and may be included in various forms including a bit string or plain text. The CMH may distinguish the type of an NF to be invoked, based on the service discriminator, but in case that there is a plurality of NFs of the type in a network, the CMH is unable to specify an NF to be invoked. Since the PDU session establishment request is a service provided by an SMF in the network, the CMH may identify that a control message received from a UE needs to be transmitted to the SMF, based on a service discriminator of the control message. However, in case that there is a plurality of SMFs in the network, the CMH is unable to exactly know which SMF instance an SMF in charge of the UE or a corresponding session is. To distinguish the SMF, the control message header includes the NF distinguisher. The NF distinguisher may include any information for specifying a destination to which the control message needs to be transmitted in case that there is a plurality of NF instances of the same type, such as an NF ID, a uniform resource identifier (URI), network slice selection assistance information (NSSAI) that may include information about a network slice to which the control message belongs, or an access point name (APN). That is, the NF distinguisher may include information useful to specify an NF in addition to an NF ID that directly indicates an NF. Further, the NF distinguisher may include information related to a function chaining description (FCD). In case that the CMH receives the control message from the UE while the UE transmits the control message to the network, the CMH may identify an NF to which the message needs to be transmitted and a service to be invoked among services provided by the NF, may convert the message into a form suitable for a SBI, and may directly invoke the service of the NF as a service customer. That is, the CMH may receive the control message from the UE, and may determine, based on the control message, whether to transmit the control message to the CU of the base station or which NF (e.g., an AMF and an SMF) the control message is transmitted to. For example, the CMH may obtain information about the service that the UE invokes, based on the control message received from the UE, and may determine an NF to which the control message transmitted by the UE is transmitted among NFs providing the service.

The UE may transmit the first control message to the communication device (1804).

For example, the CMD layer header may include identification information about a service to be invoked for the UE and information for determining the destination, and the information for determining the destination may include at least one of an identifier (ID) of an NF, a uniform resource identifier (URI), network slice selection assistance information (NSSAI) related to the service, and an access point name (APN).

For example, the CMD layer header may include identification information about a first service to be invoked for the UE, and the destination may be determined as an NF providing the service.

Figure 19:
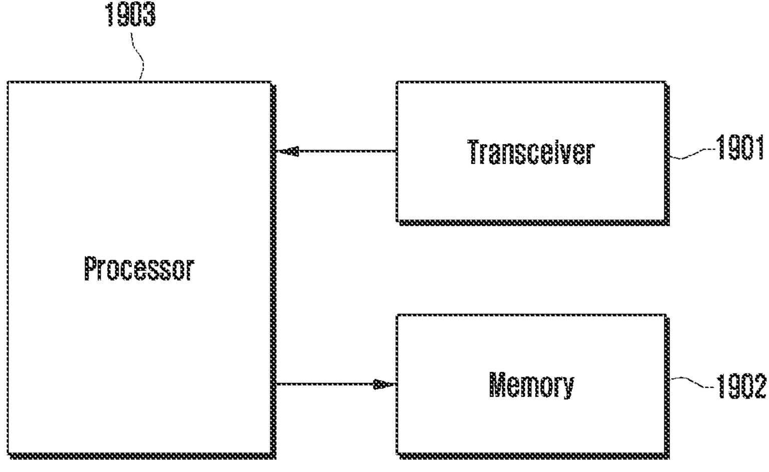
FIG. 19 illustrates an example of a UE capable of implementing the disclosure.

FIG. 19 illustrates an example of a UE capable of implementing the disclosure.

Referring to FIG. 19, the UE may include a transceiver 1901, a memory 1902, and a processor 1903. However, the UE is not limited to the foregoing components. For example, the UE may include more components or fewer components than the foregoing components. At least some or an entirety of the transceiver 1901, the memory 1902, and the processor 1903 may be configured as a single chip.

For example, the transceiver 1901 may transmit and receive a signal to and from a communication device. The signal may include control information and data. To this end, the transceiver 1901 may include an RF transmitter to upconvert and amplify the frequency of a transmitted signal and an RF receiver to perform low-noise amplification of a received signal and to downconvert the frequency of the received signal. The transceiver 1901 may receive a signal through a radio channel to output the signal to the processor 1903, and may transmit a signal output from the processor 1903 through the radio channel.

For example, the memory 1902 may store a program and data necessary for an operation of the UE. Further, the memory 1902 may store control information or data included in a signal transmitted and received by the UE. The memory 1902 may be configured as a storage medium, such as a ROM, a RAM, a hard disk, a CD-ROM, and a DVD, or a combination of storage media. The memory 1902 may include a plurality of memories. According to an embodiment, the memory 1902 may store a program to execute an operation in which the UE generates a first control message including a control message delivery (CMD) layer header that is a base for a communication device to determine a destination of the first control message among a central unit (CU) of a base station and network functions (NFs) and transmits the first control message to the communication device.

For example, the processor 1903 may control a series of processes such that the UE may operate according to the foregoing embodiments of the disclosure. In an embodiment, the processor 1903 may execute the program stored in the memory 1902, thereby controlling the operation in which the UE generates the first control message including the control message delivery (CMD) layer header that is the base for the communication device to determine the destination of the first control message among the central unit (CU) of the base station and the network functions (NFs) and transmits the first control message to the communication device.

Figure 20:
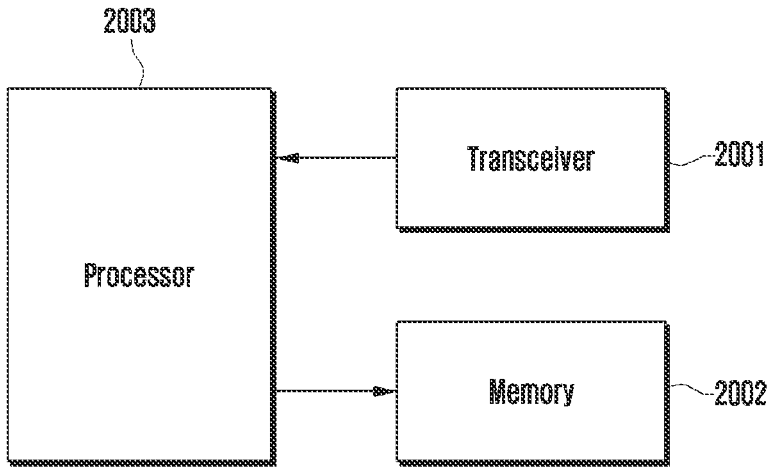
FIG. 20 illustrates an example of a communication device capable of implementing the disclosure.

FIG. 20 illustrates an example of a communication device capable of implementing the disclosure.

Referring to FIG. 20, the communication device may include a transceiver 2001, a memory 2002, and a processor 2003. However, the communication device is not limited to the foregoing components. For example, the UE may include more components or fewer components than the foregoing components. The transceiver 2001, the memory 2002, and the processor 2003 may be configured as a single chip.

For example, the transceiver 2001 may transmit and receive a signal to and from a UE. The signal may include control information and data. To this end, the transceiver 2001 may include an RF transmitter to upconvert and amplify the frequency of a transmitted signal and an RF receiver to perform low-noise amplification of a received signal and to downconvert the frequency of the received signal. The transceiver 2001 may receive a signal through a radio channel to output the signal to the processor 2003, and may transmit a signal output from the processor 2003 through the radio channel.

For example, the memory 2002 may store a program and data necessary for an operation of the UE. Further, the memory 2002 may store control information or data included in a signal transmitted and received by the UE. The memory 2002 may be configured as a storage medium, such as a ROM, a RAM, a hard disk, a CD-ROM, and a DVD, or a combination of storage media. The memory 2002 may include a plurality of memories. According to an embodiment, the memory 2002 may store a program to execute an operation in which the communication device receives a first control message including a control message delivery (CMD) layer header from the UE, determines a destination of the first control message among a central unit (CU) of a base station and network functions (NFs), based on the CMD layer header, and transmits a second control message related to the first control message to the destination.

For example, the processor 2003 may control a series of processes such that the communication device may operate according to the foregoing embodiments of the disclosure. For example, the processor 2003 may execute the program stored in the memory 2002, thereby controlling the operation in which the communication device receives the first control message including the control message delivery (CMD) layer header from the UE, determines the destination of the first control message among the central unit (CU) of the base station and the network functions (NFs), based on the CMD layer header, and transmits the second control message related to the first control message to the destination.

The methods according to various embodiments described in the claims or the specification of the disclosure may be implemented by hardware, software, or a combination of hardware and software.

In case that the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet. Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Moreover, the embodiments of the disclosure may be applied to other communication systems, and other variants based on the technical idea of the embodiments may also be implemented. For example, the embodiments may be applied to LTE, 5G, or NR systems.

The invention claimed is:

1. A method performed by a communication device of a base station in a wireless communication system, the method comprising:

receiving a first control message comprising a control message delivery (CMD) layer header from a user equipment (UE);

determining a destination of the first control message among a central unit of the base station and network functions (NFs), based on the CMD layer header; and transmitting a second control message related to the first control message to the destination, wherein the communication device comprises a CMD layer arranged under a radio resource control (RRC) layer and configured to process the CMD layer header.

2. The method of claim 1, wherein the CMD layer header comprises identification information about a first service to be invoked for the UE and information for determining the destination, and the information for determining the destination comprises at least one of an identifier (ID) of an NF, a uniform resource identifier (URI), network slice selection assistance information (NSSAI) related to the first service, and an access point name (APN).

3. The method of claim 1, wherein the second control message does not comprise the CMD layer header, and wherein in case that the destination is one of the NFs, the second control message is transmitted through a service-based interface (SBI).

4. The method of claim 1, wherein the CMD layer header comprises identification information about a first service to be invoked for the UE, and wherein the destination is determined as a first NF unit providing the first service.

5. The method of claim 4, wherein in case that a second service needs to be invoked to process the first service, a response message to the second control message is transmitted to a second NF unit providing the second service from the first NF unit, and wherein the method further comprises receiving, by the communication device, a response message to the second service from the second NF unit.

6. A method performed by a user equipment (UE) in a wireless communication system, the method comprising:

generating a first control message comprising a control message delivery (CMD) layer header that is a base for a communication device of a base station to determine a destination of the first control message among a central unit (CU) of the base station and network functions (NFs); and transmitting the first control message to the communication device, wherein the CMD layer header is processed by a CMD layer of the communication device and the CMD layer is arranged under a radio resource control (RRC) laver.

7. The method of claim 6, wherein the CMD layer header comprises identification information about a service to be invoked for the UE and information for determining the destination, and the information for determining the destination comprises at least one of an identifier (ID) of an NF, a uniform resource identifier (URI), network slice selection assistance information (NSSAI) related to the service, and an access point name (APN).

8. The method of claim 6, wherein the CMD layer header comprises identification information about a service to be invoked for the UE, and wherein the destination is determined as an NF providing the service.

9. A communication device of a base station in a wireless communication system, the communication device comprising:

a transceiver configured to transmit and receive a signal; and a processor connected to the transceiver, wherein the processor is configured to:

receive a first control message comprising a control message delivery (CMD) layer header from a user equipment (UE);

determine a destination of the first control message among a central unit of the base station and network functions (NFs), based on the CMD layer header; and transmit a second control message related to the first control message to the destination, wherein the communication device comprises a CMD layer arranged under a radio resource control (RRC) layer and configured to process the CMD layer header.

10. The communication device of claim 9, wherein the CMD layer header comprises identification information about a first service to be invoked for the UE and information for determining the destination, and the information for determining the destination comprises at least one of an identifier (ID) of an NF, a uniform resource identifier (URI), network slice selection assistance information (NSSAI) related to the first service, and an access point name (APN).

11. The communication device of claim 9, wherein the second control message does not comprise the CMD layer header, and wherein in case that the destination is one of the NFs, the second control message is transmitted through a service-based interface (SBI).

12. The communication device of claim 9, wherein the CMD layer header comprises identification information about a first service to be invoked for the UE, and wherein the destination is determined as a first NF unit providing the first service.

13. The communication device of claim 12, wherein in case that a second service needs to be invoked to process the first service, a response message to the second control message is transmitted to a second NF unit providing the second service from the first NF unit, and wherein the processor is further configured to receive a response message to the second service from the second NF unit.

14. A user equipment (UE) in a wireless communication system, the UE comprising:

a transceiver configured to transmit and receive a signal; and a processor connected to the transceiver, wherein the processor is configured to:

generate a first control message comprising a control message delivery (CMD) layer header that is a base for a communication device of a base station to determine a destination of the first control message among a central unit (CU) of the base station and network functions (NFs); and transmit the first control message to the communication device, wherein the CMD layer header is processed by a CMD layer of the communication device and the CMD layer is arranged under a radio resource control (RRC) layer.

15. The UE of claim 14, wherein the CMD layer header comprises identification information about a service to be invoked for the UE and information for determining the destination, and the information for determining the destination comprises at least one of an identifier (ID) of an NF, a uniform resource identifier (URI), network slice selection assistance information (NSSAI) related to the service, and an access point name (APN), wherein the CMD layer header comprises identification information about a service to be invoked for the UE, and wherein the destination is determined as an NF providing the service.

16. The method of claim 6, wherein a second control message does not comprise the CMD layer header, and wherein in case that the destination is one of the NFs, the second control message is transmitted through a service-based interface (SBI).

17. The method of claim 1, wherein the communication device is a distributed unit (DU) of the base station.

18. The method of claim 6, wherein the communication device is a distributed unit (DU) of the base station.

19. The communication device of claim 9, wherein the communication device is a distributed unit (DU) of the base station.

20. The UE of claim 14, wherein the communication device is a distributed unit (DU) of the base station.

* * * * *